United States Patent
Waplington

(10) Patent No.: US 12,362,995 B2
(45) Date of Patent: Jul. 15, 2025

(54) RECONCILIATION OF PARTIAL CONFIGURATION ITEMS

(71) Applicant: ServiceNow, Inc., Santa Clara, CA (US)

(72) Inventor: Brian James Waplington, San Diego, CA (US)

(73) Assignee: ServiceNow, Inc., Santa Clara, CA (US)

( * ) Notice: Subject to any disclaimer, the term of this patent is extended or adjusted under 35 U.S.C. 154(b) by 18 days.

(21) Appl. No.: 18/387,272

(22) Filed: Nov. 6, 2023

(65) Prior Publication Data

US 2025/0150340 A1    May 8, 2025

(51) Int. Cl.
*H04L 41/0823* (2022.01)
*H04L 41/12* (2022.01)
*H04L 41/16* (2022.01)

(52) U.S. Cl.
CPC .......... *H04L 41/0823* (2013.01); *H04L 41/12* (2013.01); *H04L 41/16* (2013.01)

(58) Field of Classification Search
CPC ...... H04L 41/0823; H04L 41/12; H04L 41/16
See application file for complete search history.

(56) References Cited

U.S. PATENT DOCUMENTS

| | | |
|---|---|---|
| 4,941,084 A | 7/1990 | Terada |
| 5,185,860 A | 2/1993 | Wu |
| 5,237,518 A | 8/1993 | Sztipanovits |
| 5,261,097 A | 11/1993 | Saxon |
| 5,265,252 A | 11/1993 | Rawson, III |
| 5,367,685 A | 11/1994 | Gosling |
| 5,390,297 A | 2/1995 | Barber |
| 5,442,791 A | 8/1995 | Wrabetz |
| 5,452,415 A | 9/1995 | Hotka |
| 5,522,042 A | 5/1996 | Fee |
| 5,533,116 A | 7/1996 | Vesterinen |
| 5,655,081 A | 8/1997 | Bonnell |
| 5,659,736 A | 8/1997 | Hasegawa |
| 5,671,412 A | 9/1997 | Christiano |
| 5,696,701 A | 12/1997 | Burgess |
| 5,715,463 A | 2/1998 | Merkin |

(Continued)

FOREIGN PATENT DOCUMENTS

| | | |
|---|---|---|
| EP | 0433979 A2 | 6/1991 |
| EP | 1607824 A2 | 12/2005 |

(Continued)

OTHER PUBLICATIONS

International Search Report and Written Opinion, PCT Application PCT/US2024/047444, mailed Dec. 24, 2024.

*Primary Examiner* — Benjamin M Thieu
(74) *Attorney, Agent, or Firm* — McDonnell Boehnen Hulbert & Berghoff LLP

(57) ABSTRACT

An example embodiment may involve determining that a configuration item has failed identification, wherein the configuration item represents computing hardware or software associated with a network; based on the configuration item failing identification, performing a reconciliation procedure, wherein the reconciliation procedure modifies an attribute of the configuration item; determining that the configuration item as modified passes identification; and writing, to a database, the configuration item as modified.

20 Claims, 12 Drawing Sheets

(56) References Cited

U.S. PATENT DOCUMENTS

| | | |
|---|---|---|
| 5,745,879 A | 4/1998 | Wyman |
| 5,761,502 A | 6/1998 | Jacobs |
| 5,764,913 A | 6/1998 | Jancke |
| 5,887,139 A | 3/1999 | Madison, Jr. |
| 5,909,217 A | 6/1999 | Bereiter |
| 5,937,165 A | 8/1999 | Schwaller |
| 5,949,976 A | 9/1999 | Chappelle |
| 5,978,594 A | 11/1999 | Bonnell |
| 6,021,437 A | 2/2000 | Chen |
| 6,041,347 A | 3/2000 | Harsham |
| 6,088,717 A | 7/2000 | Reed |
| 6,101,500 A | 8/2000 | Lau |
| 6,128,016 A | 10/2000 | Coelho |
| 6,131,118 A | 10/2000 | Stupek, Jr. |
| 6,134,581 A | 10/2000 | Ismael |
| 6,138,122 A | 10/2000 | Smith |
| 6,148,335 A | 11/2000 | Haggard |
| 6,166,732 A | 12/2000 | Mitchell |
| 6,167,448 A | 12/2000 | Hemphill |
| 6,175,866 B1 | 1/2001 | Holloway |
| 6,175,878 B1 | 1/2001 | Seaman |
| 6,260,050 B1 | 7/2001 | Yost |
| 6,263,457 B1 | 7/2001 | Anderson |
| 6,272,150 B1 | 8/2001 | Irastar |
| 6,336,138 B1 | 1/2002 | Caswell |
| 6,363,421 B2 | 3/2002 | Barker |
| 6,393,386 B1 | 5/2002 | Zager |
| 6,397,245 B1 | 5/2002 | Johnson, II |
| 6,434,626 B1 | 8/2002 | Prakash |
| 6,438,592 B1 | 8/2002 | Killian |
| 6,456,306 B1 | 9/2002 | Chin |
| 6,466,932 B1 | 10/2002 | Dennis |
| 6,487,590 B1 | 11/2002 | Foley |
| 6,505,248 B1 | 1/2003 | Casper |
| 6,526,442 B1 | 2/2003 | Stupek, Jr. |
| 6,621,823 B1 | 9/2003 | Mellquist |
| 6,707,795 B1 | 3/2004 | Noorhosseini |
| 6,742,015 B1 | 5/2004 | Bowman-Amuah |
| 6,763,380 B1 | 7/2004 | Mayton |
| 6,816,898 B1 | 11/2004 | Joe |
| 6,895,586 B1 | 5/2005 | Brasher |
| 6,948,175 B1 | 9/2005 | Fong |
| 6,985,901 B1 | 1/2006 | Sachse |
| 7,003,564 B2 | 2/2006 | Greuel |
| 7,028,228 B1 | 4/2006 | Lovy |
| 7,043,537 B1 | 5/2006 | Pratt |
| 7,043,661 B2 | 5/2006 | Valadarsky |
| 7,062,683 B2 | 6/2006 | Warpenburg |
| 7,096,459 B2 | 8/2006 | Keller |
| 7,146,574 B2 | 12/2006 | Goldthwaite |
| 7,197,466 B1 | 3/2007 | Peterson |
| 7,215,360 B2 | 5/2007 | Gupta |
| 7,216,304 B1 | 5/2007 | Gourdol |
| 7,222,147 B1 | 5/2007 | Black |
| 7,281,170 B2 | 10/2007 | Taylor |
| 7,412,502 B2 | 8/2008 | Fearn |
| 7,505,872 B2 | 3/2009 | Keller |
| 7,593,013 B2 | 9/2009 | Agutter |
| 7,596,716 B2 | 9/2009 | Frost |
| 7,617,073 B2 | 11/2009 | Trinon |
| 7,660,731 B2 | 2/2010 | Chaddha |
| 7,676,294 B2 | 3/2010 | Baier |
| 7,676,437 B2 | 3/2010 | Satkunanathan |
| 7,840,490 B1 | 11/2010 | Sellers |
| 7,877,783 B1 | 1/2011 | Cline |
| 7,890,869 B1 | 2/2011 | Mayer |
| 7,966,398 B2 | 6/2011 | Wiles, Jr. |
| 8,060,396 B1 | 11/2011 | Bessler |
| 8,196,210 B2 | 6/2012 | Sterin |
| 8,321,948 B2 | 11/2012 | Robinson |
| 8,407,669 B2 | 3/2013 | Yee |
| 8,554,750 B2 | 10/2013 | Rangarajan |
| 8,595,647 B2 | 11/2013 | Sabin |
| 8,620,818 B2 | 12/2013 | Hughes |
| 8,646,093 B2 | 2/2014 | Myers |
| 8,674,992 B2 | 3/2014 | Poston |
| 8,712,979 B2 | 4/2014 | Morozov |
| 8,725,647 B2 | 5/2014 | Disciascio |
| 9,053,460 B2 | 6/2015 | Gilbert |
| 9,069,737 B1 | 6/2015 | Kimotho |
| 9,971,826 B1 | 5/2018 | Belmar |
| 10,673,963 B1 | 6/2020 | Feiguine |
| 10,749,943 B1 | 8/2020 | Feiguine |
| 10,771,344 B2 | 9/2020 | Bitterfeld |
| 10,824,650 B2 | 11/2020 | Bar Oz |
| 10,944,654 B2 | 3/2021 | Rimar |
| 10,999,152 B1 | 5/2021 | Bar Oz |
| 11,025,481 B1 | 6/2021 | Louca |
| 11,089,115 B2 | 8/2021 | Garty |
| 11,095,506 B1 | 8/2021 | Erblat |
| 11,275,580 B2 | 3/2022 | Tamir |
| 11,277,475 B1 | 3/2022 | Tal |
| 11,281,442 B1 | 3/2022 | Tal |
| 11,294,666 B1 | 4/2022 | Look |
| 11,296,922 B1 | 4/2022 | Leibkowiz |
| 11,301,503 B2 | 4/2022 | Burli |
| 11,379,089 B2 | 7/2022 | Goswami |
| 11,451,573 B2 | 9/2022 | Waplington |
| 11,470,107 B2 | 10/2022 | Waplington |
| 11,582,106 B2 | 2/2023 | Hameiri |
| 11,616,690 B2 | 3/2023 | Feiguine |
| 11,630,717 B2 | 4/2023 | Vutukuru |
| 11,632,303 B2 | 4/2023 | Bitterfeld |
| 11,640,369 B2 | 5/2023 | Bhogle |
| 11,671,444 B2 | 6/2023 | Waplington |
| 11,695,641 B2 | 7/2023 | Bar Oz |
| 2002/0116340 A1 | 8/2002 | Hellberg |
| 2002/0133584 A1 | 9/2002 | Greuel |
| 2002/0158969 A1 | 10/2002 | Gupta |
| 2003/0118087 A1 | 6/2003 | Goldthwaite |
| 2003/0200293 A1 | 10/2003 | Fearn |
| 2005/0015217 A1 | 1/2005 | Weidl |
| 2005/0091356 A1 | 4/2005 | Izzo |
| 2006/0026453 A1 | 2/2006 | Frost |
| 2006/0095461 A1 | 5/2006 | Raymond |
| 2006/0179058 A1 | 8/2006 | Bram |
| 2006/0288053 A1 | 12/2006 | Holt |
| 2006/0293942 A1 | 12/2006 | Chaddha |
| 2007/0033279 A1 | 2/2007 | Battat |
| 2007/0188494 A1 | 8/2007 | Agutter |
| 2007/0288389 A1 | 12/2007 | Vaughan |
| 2008/0133289 A1 | 6/2008 | Armour |
| 2008/0148253 A1 | 6/2008 | Badwe |
| 2008/0319779 A1 | 12/2008 | Hughes |
| 2009/0088875 A1 | 4/2009 | Baier |
| 2009/0228984 A1 | 9/2009 | Sterin |
| 2009/0319559 A1 | 12/2009 | Westerfeld |
| 2010/0110932 A1 | 5/2010 | Doran |
| 2013/0283273 A1 | 10/2013 | Miyazaki |
| 2014/0122427 A1 | 5/2014 | Dary |
| 2018/0123940 A1 | 5/2018 | Rimar |
| 2019/0058643 A1* | 2/2019 | Knowles ............. G06F 9/45558 |
| 2019/0073257 A1 | 3/2019 | Dasgupta |
| 2019/0104398 A1* | 4/2019 | Owen .................... H04L 67/51 |
| 2019/0129739 A1 | 5/2019 | Al Reza |
| 2019/0149515 A1 | 5/2019 | Sharma |
| 2019/0165957 A1 | 5/2019 | Abbott |
| 2019/0342162 A1 | 11/2019 | Bendre |
| 2020/0034462 A1 | 1/2020 | Narayanasamy |
| 2020/0050689 A1 | 2/2020 | Tal |
| 2020/0089750 A1 | 3/2020 | Ros |
| 2020/0204443 A1 | 6/2020 | Bar Oz |
| 2020/0301678 A1 | 9/2020 | Burman |
| 2020/0328941 A1 | 10/2020 | Feiguine |
| 2021/0097168 A1 | 4/2021 | Patel |
| 2021/0194764 A1 | 6/2021 | Badyan |
| 2021/0248108 A1 | 8/2021 | Martinez Lerin |
| 2021/0392155 A1* | 12/2021 | Waplington ........ H04L 63/1433 |

(56) References Cited

U.S. PATENT DOCUMENTS

2022/0050815 A1    2/2022   Peterkin
2022/0311740 A1    9/2022   Gautam

FOREIGN PATENT DOCUMENTS

| WO | 9934285 | W | 7/1999 |
| WO | 0052559 | W | 9/2000 |
| WO | 0179970 | W | 10/2001 |

* cited by examiner

RECONCILIATION OF PARTIAL CONFIGURATION ITEMS

BACKGROUND

Discovery refers to a collection of procedures that can be used to identify computer hardware and software components disposed upon one or more networks, and to store representations of these components as configuration items. In some scenarios, it is common for the identification process to fail in one of several ways, resulting in discovery being unable to fully identify certain components. As a consequence, a significant portion of configuration items may remain in a partial state with missing attributes that limits or prevents their use by other applications. Further, techniques for disambiguating such partial configuration items are memory-intensive, inefficient, and often ineffective.

SUMMARY

Various implementations disclosed herein include solutions to these and possibly other technical problems. Particularly, a secondary reconciliation may be performed on partial configuration items in order to determine their missing attributes. This secondary reconciliation may involve performing another set of discovery operations using a different discovery data source or a different discovery configuration. Alternatively or additionally, a trained machine learning model or generative artificial intelligence (AI) model can be employed to predict missing attributes without requiring further discovery procedures. Doing so can result in at least some partial configuration items being reconciled and placed in a condition for use by other applications. Further, secondary reconciliation can be performed in an efficient streaming or pipelined fashion that only uses a limited amount of main memory while partial configuration items are being reconciled.

Accordingly, a first example embodiment may involve determining that a configuration item has failed identification, wherein the configuration item represents computing hardware or software associated with a network; based on the configuration item failing identification, performing a reconciliation procedure, wherein the reconciliation procedure modifies an attribute of the configuration item; determining that the configuration item as modified passes identification; and writing, to a database, the configuration item as modified.

A third example embodiment may involve a non-transitory computer-readable medium, having stored thereon program instructions that, upon execution by a computing system, cause the computing system to perform operations in accordance with the first example embodiment.

In a fourth example embodiment, a computing system may include at least one processor, as well as memory and program instructions. The program instructions may be stored in the memory, and upon execution by the at least one processor, cause the computing system to perform operations in accordance with the first example embodiment.

In a fifth example embodiment, a system may include various means for carrying out each of the operations of the first example embodiment.

These, as well as other embodiments, aspects, advantages, and alternatives, will become apparent to those of ordinary skill in the art by reading the following detailed description, with reference where appropriate to the accompanying drawings. Further, this summary and other descriptions and figures provided herein are intended to illustrate embodiments by way of example only and, as such, that numerous variations are possible. For instance, structural elements and process steps can be rearranged, combined, distributed, eliminated, or otherwise changed, while remaining within the scope of the embodiments as claimed.

DETAILED DESCRIPTION

Figure 1:
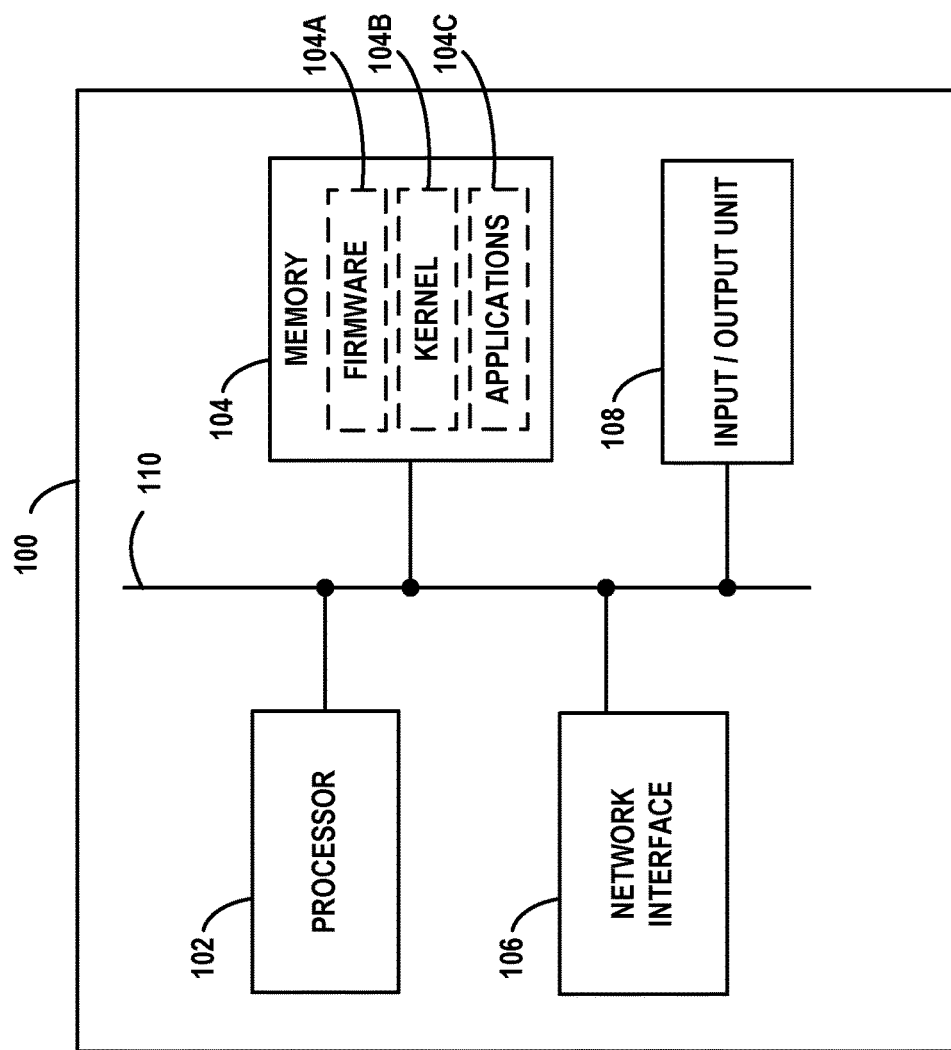
FIG. 1 illustrates a schematic drawing of a computing device, in accordance with example embodiments.

Example methods, devices, and systems are described herein. It should be understood that the words "example" and "exemplary" are used herein to mean "serving as an example, instance, or illustration." Any embodiment or feature described herein as being an "example" or "exemplary" is not necessarily to be construed as preferred or advantageous over other embodiments or features unless stated as such. Thus, other embodiments can be utilized and other changes can be made without departing from the scope of the subject matter presented herein.

Accordingly, the example embodiments described herein are not meant to be limiting. It will be readily understood that the aspects of the present disclosure, as generally described herein, and illustrated in the figures, can be arranged, substituted, combined, separated, and designed in a wide variety of different configurations. For example, the separation of features into "client" and "server" components may occur in a number of ways.

Further, unless context suggests otherwise, the features illustrated in each of the figures may be used in combination with one another. Thus, the figures should be generally viewed as component aspects of one or more overall embodiments, with the understanding that not all illustrated features are necessary for each embodiment.

Additionally, any enumeration of elements, blocks, or steps in this specification or the claims is for purposes of clarity. Thus, such enumeration should not be interpreted to require or imply that these elements, blocks, or steps adhere to a particular arrangement or are carried out in a particular order.

I. Introduction

A large enterprise is a complex entity with many interrelated operations. Some of these are found across the enterprise, such as human resources (HR), supply chain, information technology (IT), and finance. However, each enterprise also has its own unique operations that provide essential capabilities and/or create competitive advantages.

To support widely-implemented operations, enterprises typically use off-the-shelf software applications, such as customer relationship management (CRM) and human capital management (HCM) packages. However, they may also need custom software applications to meet their own unique requirements. A large enterprise often has dozens or hundreds of these custom software applications. Nonetheless, the advantages provided by the embodiments herein are not limited to large enterprises and may be applicable to an enterprise, or any other type of organization, of any size.

Many such software applications are developed by individual departments within the enterprise. These range from simple spreadsheets to custom-built software tools and databases. But the proliferation of siloed custom software applications has numerous disadvantages. It negatively impacts an enterprise's ability to run and grow its operations, innovate, and meet regulatory requirements. The enterprise may find it difficult to integrate, streamline, and enhance its operations due to lack of a single system that unifies its subsystems and data.

To efficiently create custom applications, enterprises would benefit from a remotely-hosted application platform that eliminates unnecessary development complexity. The goal of such a platform would be to reduce time-consuming, repetitive application development tasks so that software engineers and individuals in other roles can focus on developing unique, high-value features.

In order to achieve this goal, the concept of Application Platform as a Service (aPaaS) is introduced, to intelligently automate workflows throughout the enterprise. An aPaaS system is hosted remotely from the enterprise, but may access data, applications, and services within the enterprise by way of secure connections. Such an aPaaS system may have a number of advantageous capabilities and characteristics. These advantages and characteristics may be able to improve the enterprise's operations and workflows for IT, HR, CRM, customer service, application development, and security. Nonetheless, the embodiments herein are not limited to enterprise applications or environments, and can be more broadly applied.

The aPaaS system may support development and execution of model-view-controller (MVC) applications. MVC applications divide their functionality into three interconnected parts (model, view, and controller) in order to isolate representations of information from the manner in which the information is presented to the user, thereby allowing for efficient code reuse and parallel development. These applications may be web-based, and offer create, read, update, and delete (CRUD) capabilities. This allows new applications to be built on a common application infrastructure. In some cases, applications structured differently than MVC, such as those using unidirectional data flow, may be employed.

The aPaaS system may support standardized application components, such as a standardized set of widgets for graphical user interface (GUI) development. In this way, applications built using the aPaaS system have a common look and feel. Other software components and modules may be standardized as well. In some cases, this look and feel can be branded or skinned with an enterprise's custom logos and/or color schemes.

The aPaaS system may support the ability to configure the behavior of applications using metadata. This allows application behaviors to be rapidly adapted to meet specific needs. Such an approach reduces development time and increases flexibility. Further, the aPaaS system may support GUI tools that facilitate metadata creation and management, thus reducing errors in the metadata.

The aPaaS system may support clearly-defined interfaces between applications, so that software developers can avoid unwanted inter-application dependencies. Thus, the aPaaS system may implement a service layer in which persistent state information and other data are stored.

The aPaaS system may support a rich set of integration features so that the applications thereon can interact with legacy applications and third-party applications. For instance, the aPaaS system may support a custom employee-onboarding system that integrates with legacy HR, IT, and accounting systems.

The aPaaS system may support enterprise-grade security. Furthermore, since the aPaaS system may be remotely hosted, it should also utilize security procedures when it interacts with systems in the enterprise or third-party networks and services hosted outside of the enterprise. For example, the aPaaS system may be configured to share data amongst the enterprise and other parties to detect and identify common security threats.

Other features, functionality, and advantages of an aPaaS system may exist. This description is for purpose of example and is not intended to be limiting.

As an example of the aPaaS development process, a software developer may be tasked to create a new application using the aPaaS system. First, the developer may define the data model, which specifies the types of data that the application uses and the relationships therebetween. Then, via a GUI of the aPaaS system, the developer enters (e.g., uploads) the data model. The aPaaS system automatically creates all of the corresponding database tables, fields, and relationships, which can then be accessed via an object-oriented services layer.

In addition, the aPaaS system can also build a fully-functional application with client-side interfaces and server-side CRUD logic. This generated application may serve as the basis of further development for the user. Advantageously, the developer does not have to spend a large amount of time on basic application functionality. Further, since the application may be web-based, it can be accessed from any Internet-enabled client device. Alternatively or additionally, a local copy of the application may be able to be accessed, for instance, when Internet service is not available.

The aPaaS system may also support a rich set of pre-defined functionality that can be added to applications. These features include support for searching, email, templating, workflow design, reporting, analytics, social media, scripting, mobile-friendly output, and customized GUIs.

Such an aPaaS system may represent a GUI in various ways. For example, a server device of the aPaaS system may generate a representation of a GUI using a combination of HyperText Markup Language (HTML) and JAVASCRIPT®. The JAVASCRIPT® may include client-side executable code, server-side executable code, or both. The server device may transmit or otherwise provide this representation to a client device for the client device to display on a screen according to its locally-defined look and feel. Alternatively, a representation of a GUI may take other forms, such as an intermediate form (e.g., JAVA® byte-code) that a client device can use to directly generate graphical output therefrom. Other possibilities exist.

Further, user interaction with GUI elements, such as buttons, menus, tabs, sliders, checkboxes, toggles, etc. may be referred to as "selection", "activation", or "actuation" thereof. These terms may be used regardless of whether the GUI elements are interacted with by way of keyboard, pointing device, touchscreen, or another mechanism.

An aPaaS architecture is particularly powerful when integrated with an enterprise's network and used to manage such a network. The following embodiments describe architectural and functional aspects of example aPaaS systems, as well as the features and advantages thereof.

II. Example Computing Devices and Cloud-Based Computing Environments

FIG. 1 is a simplified block diagram exemplifying a computing device 100, illustrating some of the components that could be included in a computing device arranged to operate in accordance with the embodiments herein. Computing device 100 could be a client device (e.g., a device actively operated by a user), a server device (e.g., a device that provides computational services to client devices), or some other type of computational platform. Some server devices may operate as client devices from time to time in order to perform particular operations, and some client devices may incorporate server features.

In this example, computing device 100 includes processor 102, memory 104, network interface 106, and input/output unit 108, all of which may be coupled by system bus 110 or a similar mechanism. In some embodiments, computing device 100 may include other components and/or peripheral devices (e.g., detachable storage, printers, and so on).

Processor 102 may be one or more of any type of computer processing element, such as a central processing unit (CPU), a co-processor (e.g., a mathematics, graphics, or encryption co-processor), a digital signal processor (DSP), a network processor, and/or a form of integrated circuit or controller that performs processor operations. In some cases, processor 102 may be one or more single-core processors. In other cases, processor 102 may be one or more multi-core processors with multiple independent processing units. Processor 102 may also include register memory for temporarily storing instructions being executed and related data, as well as cache memory for temporarily storing recently-used instructions and data.

Memory 104 may be any form of computer-usable memory, including but not limited to random access memory (RAM), read-only memory (ROM), and non-volatile memory (e.g., flash memory, hard disk drives, solid state drives, compact discs (CDs), digital video discs (DVDs), and/or tape storage). Thus, memory 104 represents both main memory units, as well as long-term storage. Other types of memory may include biological memory.

Memory 104 may store program instructions and/or data on which program instructions may operate. By way of example, memory 104 may store these program instructions on a non-transitory, computer-readable medium, such that the instructions are executable by processor 102 to carry out any of the methods, processes, or operations disclosed in this specification or the accompanying drawings.

As shown in FIG. 1, memory 104 may include firmware 104A, kernel 104B, and/or applications 104C. Firmware 104A may be program code used to boot or otherwise initiate some or all of computing device 100. Kernel 104B may be an operating system, including modules for memory management, scheduling and management of processes, input/output, and communication. Kernel 104B may also include device drivers that allow the operating system to communicate with the hardware modules (e.g., memory units, networking interfaces, ports, and buses) of computing device 100. Applications 104C may be one or more user-space software programs, such as web browsers or email clients, as well as any software libraries used by these programs. Memory 104 may also store data used by these and other programs and applications.

Network interface 106 may take the form of one or more wireline interfaces, such as Ethernet (e.g., Fast Ethernet, Gigabit Ethernet, and so on). Network interface 106 may also support communication over one or more non-Ethernet media, such as coaxial cables or power lines, or over wide-area media, such as Synchronous Optical Networking (SONET) or digital subscriber line (DSL) technologies. Network interface 106 may additionally take the form of one or more wireless interfaces, such as IEEE 802.11 (Wifi), BLUETOOTH®, global positioning system (GPS), or a wide-area wireless interface. However, other forms of physical layer interfaces and other types of standard or proprietary communication protocols may be used over network interface 106. Furthermore, network interface 106 may comprise multiple physical interfaces. For instance, some embodiments of computing device 100 may include Ethernet, BLUETOOTH®, and Wifi interfaces.

Input/output unit 108 may facilitate user and peripheral device interaction with computing device 100. Input/output unit 108 may include one or more types of input devices, such as a keyboard, a mouse, a touch screen, and so on. Similarly, input/output unit 108 may include one or more types of output devices, such as a screen, monitor, printer, and/or one or more light emitting diodes (LEDs). Additionally or alternatively, computing device 100 may communicate with other devices using a universal serial bus (USB) or high-definition multimedia interface (HDMI) port interface, for example.

In some embodiments, one or more computing devices like computing device 100 may be deployed to support an aPaaS architecture. The exact physical location, connectivity, and configuration of these computing devices may be unknown and/or unimportant to client devices. Accordingly, the computing devices may be referred to as "cloud-based" devices that may be housed at various remote data center locations.

Figure 2:
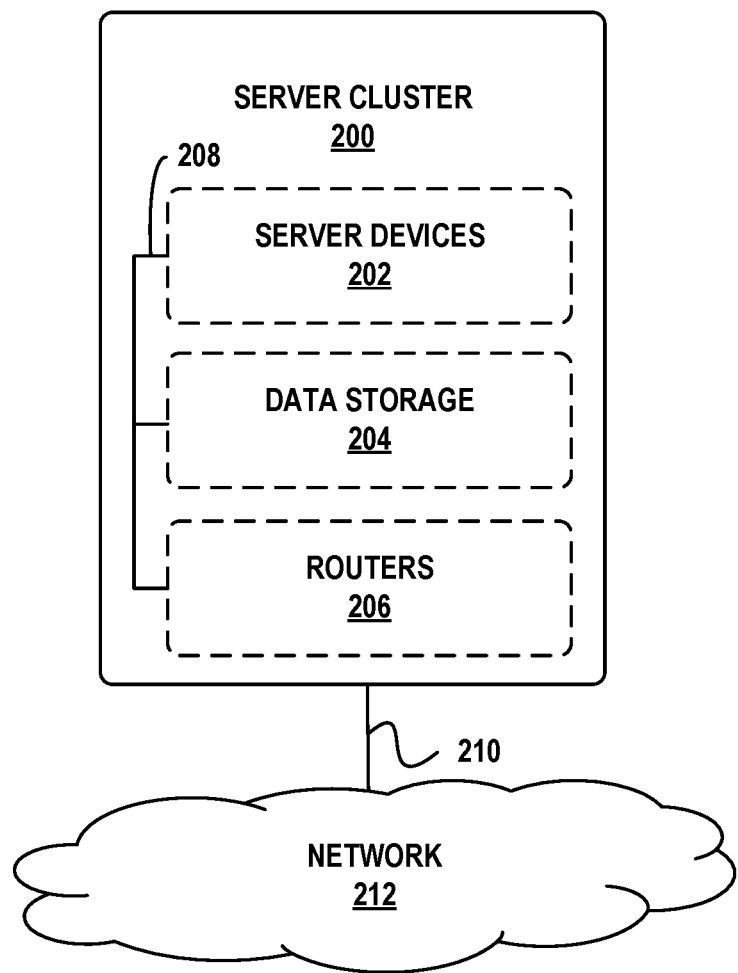
FIG. 2 illustrates a schematic drawing of a server device cluster, in accordance with example embodiments.

FIG. 2 depicts a cloud-based server cluster 200 in accordance with example embodiments. In FIG. 2, operations of a computing device (e.g., computing device 100) may be distributed between server devices 202, data storage 204, and routers 206, all of which may be connected by local cluster network 208. The number of server devices 202, data storages 204, and routers 206 in server cluster 200 may depend on the computing task(s) and/or applications assigned to server cluster 200.

For example, server devices 202 can be configured to perform various computing tasks of computing device 100. Thus, computing tasks can be distributed among one or more of server devices 202. To the extent that these computing tasks can be performed in parallel, such a distribution of tasks may reduce the total time to complete these tasks and return a result. For purposes of simplicity, both server cluster 200 and individual server devices 202 may be referred to as a "server device." This nomenclature should be understood to imply that one or more distinct server devices, data storage devices, and cluster routers may be involved in server device operations.

Data storage 204 may be data storage arrays that include drive array controllers configured to manage read and write access to groups of hard disk drives and/or solid state drives. The drive array controllers, alone or in conjunction with server devices 202, may also be configured to manage backup or redundant copies of the data stored in data storage 204 to protect against drive failures or other types of failures that prevent one or more of server devices 202 from accessing units of data storage 204. Other types of memory aside from drives may be used.

Routers 206 may include networking equipment configured to provide internal and external communications for server cluster 200. For example, routers 206 may include one or more packet-switching and/or routing devices (including switches and/or gateways) configured to provide (i) network communications between server devices 202 and data storage 204 via local cluster network 208, and/or (ii) network communications between server cluster 200 and other devices via communication link 210 to network 212.

Additionally, the configuration of routers 206 can be based at least in part on the data communication requirements of server devices 202 and data storage 204, the latency and throughput of the local cluster network 208, the latency, throughput, and cost of communication link 210, and/or other factors that may contribute to the cost, speed, fault-tolerance, resiliency, efficiency, and/or other design goals of the system architecture.

As a possible example, data storage 204 may include any form of database, such as a structured query language (SQL) database. Various types of data structures may store the information in such a database, including but not limited to tables, arrays, lists, trees, and tuples. Furthermore, any databases in data storage 204 may be monolithic or distributed across multiple physical devices.

Server devices 202 may be configured to transmit data to and receive data from data storage 204. This transmission and retrieval may take the form of SQL queries or other types of database queries, and the output of such queries, respectively. Additional text, images, video, and/or audio may be included as well. Furthermore, server devices 202 may organize the received data into web page or web application representations. Such a representation may take the form of a markup language, such as HTML, the extensible Markup Language (XML), or some other standardized or proprietary format. Moreover, server devices 202 may have the capability of executing various types of computerized scripting languages, such as but not limited to Perl, Python, PHP Hypertext Preprocessor (PHP), Active Server Pages (ASP), JAVASCRIPT®, and so on. Computer program code written in these languages may facilitate the providing of web pages to client devices, as well as client device interaction with the web pages. Alternatively or additionally, JAVA® may be used to facilitate generation of web pages and/or to provide web application functionality.

III. Example Remote Network Management Architecture

Figure 3:
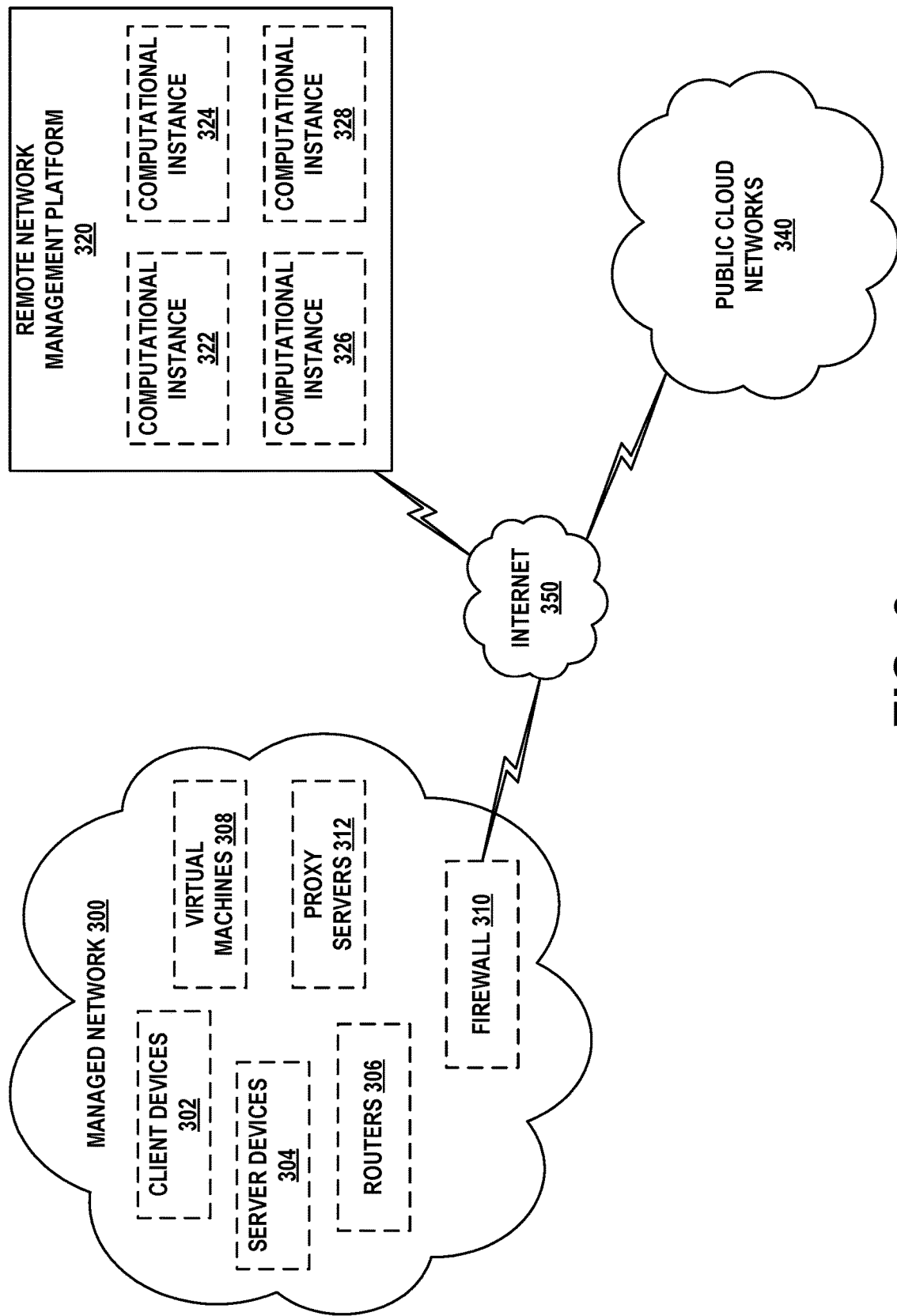
FIG. 3 depicts a remote network management architecture, in accordance with example embodiments.

FIG. 3 depicts a remote network management architecture, in accordance with example embodiments. This architecture includes three main components—managed network 300, remote network management platform 320, and public cloud networks 340—all connected by way of Internet 350.

A. Managed Networks

Managed network 300 may be, for example, an enterprise network used by an entity for computing and communications tasks, as well as storage of data. Thus, managed network 300 may include client devices 302, server devices 304, routers 306, virtual machines 308, firewall 310, and/or proxy servers 312. Client devices 302 may be embodied by computing device 100, server devices 304 may be embodied by computing device 100 or server cluster 200, and routers 306 may be any type of router, switch, or gateway.

Virtual machines 308 may be embodied by one or more of computing device 100 or server cluster 200. In general, a virtual machine is an emulation of a computing system, and mimics the functionality (e.g., processor, memory, and communication resources) of a physical computer. One physical computing system, such as server cluster 200, may support up to thousands of individual virtual machines. In some embodiments, virtual machines 308 may be managed by a centralized server device or application that facilitates allocation of physical computing resources to individual virtual machines, as well as performance and error reporting. Enterprises often employ virtual machines in order to allocate computing resources in an efficient, as needed fashion. Providers of virtualized computing systems include VMWARE® and MICROSOFT®.

Firewall 310 may be one or more specialized routers or server devices that protect managed network 300 from unauthorized attempts to access the devices, applications, and services therein, while allowing authorized communication that is initiated from managed network 300. Firewall 310 may also provide intrusion detection, web filtering, virus scanning, application-layer gateways, and other applications or services. In some embodiments not shown in FIG. 3, managed network 300 may include one or more virtual private network (VPN) gateways with which it communicates with remote network management platform 320 (see below).

Managed network 300 may also include one or more proxy servers 312. An embodiment of proxy servers 312 may be a server application that facilitates communication and movement of data between managed network 300, remote network management platform 320, and public cloud networks 340. In particular, proxy servers 312 may be able to establish and maintain secure communication sessions with one or more computational instances of remote network management platform 320. By way of such a session, remote network management platform 320 may be able to discover and manage aspects of the architecture and configuration of managed network 300 and its components.

Possibly with the assistance of proxy servers 312, remote network management platform 320 may also be able to discover and manage aspects of public cloud networks 340 that are used by managed network 300. While not shown in FIG. 3, one or more proxy servers 312 may be placed in any of public cloud networks 340 in order to facilitate this discovery and management.

Firewalls, such as firewall 310, typically deny all communication sessions that are incoming by way of Internet 350, unless such a session was ultimately initiated from behind the firewall (i.e., from a device on managed network 300) or the firewall has been explicitly configured to support the session. By placing proxy servers 312 behind firewall 310 (e.g., within managed network 300 and protected by firewall 310), proxy servers 312 may be able to initiate these communication sessions through firewall 310. Thus, firewall 310 might not have to be specifically configured to support incoming sessions from remote network management platform 320, thereby avoiding potential security risks to managed network 300.

In some cases, managed network 300 may consist of a few devices and a small number of networks. In other deployments, managed network 300 may span multiple physical locations and include hundreds of networks and hundreds of thousands of devices. Thus, the architecture depicted in FIG. 3 is capable of scaling up or down by orders of magnitude.

Furthermore, depending on the size, architecture, and connectivity of managed network 300, a varying number of proxy servers 312 may be deployed therein. For example, each one of proxy servers 312 may be responsible for communicating with remote network management platform 320 regarding a portion of managed network 300. Alternatively or additionally, sets of two or more proxy servers may be assigned to such a portion of managed network 300 for purposes of load balancing, redundancy, and/or high availability.

B. Remote Network Management Platforms

Remote network management platform 320 is a hosted environment that provides aPaaS services to users, particularly to the operator of managed network 300. These services may take the form of web-based portals, for example, using the aforementioned web-based technologies. Thus, a user can securely access remote network management platform 320 from, for example, client devices 302, or potentially from a client device outside of managed network 300. By way of the web-based portals, users may design, test, and deploy applications, generate reports, view analytics, and perform other tasks. Remote network management platform 320 may also be referred to as a multi-application platform.

As shown in FIG. 3, remote network management platform 320 includes four computational instances 322, 324, 326, and 328. Each of these computational instances may represent one or more server nodes operating dedicated copies of the aPaaS software and/or one or more database nodes. The arrangement of server and database nodes on physical server devices and/or virtual machines can be flexible and may vary based on enterprise needs. In combination, these nodes may provide a set of web portals, services, and applications (e.g., a wholly-functioning aPaaS system) available to a particular enterprise. In some cases, a single enterprise may use multiple computational instances.

For example, managed network 300 may be an enterprise customer of remote network management platform 320, and may use computational instances 322, 324, and 326. The reason for providing multiple computational instances to one customer is that the customer may wish to independently develop, test, and deploy its applications and services. Thus, computational instance 322 may be dedicated to application development related to managed network 300, computational instance 324 may be dedicated to testing these applications, and computational instance 326 may be dedicated to the live operation of tested applications and services. A computational instance may also be referred to as a hosted instance, a remote instance, a customer instance, or by some other designation. Any application deployed onto a computational instance may be a scoped application, in that its access to databases within the computational instance can be restricted to certain elements therein (e.g., one or more particular database tables or particular rows within one or more database tables).

For purposes of clarity, the disclosure herein refers to the arrangement of application nodes, database nodes, aPaaS software executing thereon, and underlying hardware as a "computational instance." Note that users may colloquially refer to the graphical user interfaces provided thereby as "instances." But unless it is defined otherwise herein, a "computational instance" is a computing system disposed within remote network management platform 320.

The multi-instance architecture of remote network management platform 320 is in contrast to conventional multi-tenant architectures, over which multi-instance architectures exhibit several advantages. In multi-tenant architectures, data from different customers (e.g., enterprises) are comingled in a single database. While these customers' data are separate from one another, the separation is enforced by the software that operates the single database. As a consequence, a security breach in this system may affect all customers' data, creating additional risk, especially for entities subject to governmental, healthcare, and/or financial regulation. Furthermore, any database operations that affect one customer will likely affect all customers sharing that database. Thus, if there is an outage due to hardware or software errors, this outage affects all such customers. Likewise, if the database is to be upgraded to meet the needs of one customer, it will be unavailable to all customers during the upgrade process. Often, such maintenance windows will be long, due to the size of the shared database.

In contrast, the multi-instance architecture provides each customer with its own database in a dedicated computing instance. This prevents comingling of customer data, and allows each instance to be independently managed. For example, when one customer's instance experiences an outage due to errors or an upgrade, other computational instances are not impacted. Maintenance down time is limited because the database only contains one customer's data. Further, the simpler design of the multi-instance architecture allows redundant copies of each customer database and instance to be deployed in a geographically diverse fashion. This facilitates high availability, where the live version of the customer's instance can be moved when faults are detected or maintenance is being performed.

In some embodiments, remote network management platform 320 may include one or more central instances, controlled by the entity that operates this platform. Like a computational instance, a central instance may include some number of application and database nodes disposed upon some number of physical server devices or virtual machines. Such a central instance may serve as a repository for specific configurations of computational instances as well as data that can be shared amongst at least some of the computational instances. For instance, definitions of common security threats that could occur on the computational instances, software packages that are commonly discovered on the computational instances, and/or an application store for applications that can be deployed to the computational instances may reside in a central instance. Computational instances may communicate with central instances by way of well-defined interfaces in order to obtain this data.

In order to support multiple computational instances in an efficient fashion, remote network management platform 320 may implement a plurality of these instances on a single hardware platform. For example, when the aPaaS system is implemented on a server cluster such as server cluster 200, it may operate virtual machines that dedicate varying amounts of computational, storage, and communication resources to instances. But full virtualization of server cluster 200 might not be necessary, and other mechanisms may be used to separate instances. In some examples, each instance may have a dedicated account and one or more dedicated databases on server cluster 200. Alternatively, a computational instance such as computational instance 322 may span multiple physical devices.

In some cases, a single server cluster of remote network management platform 320 may support multiple independent enterprises. Furthermore, as described below, remote network management platform 320 may include multiple server clusters deployed in geographically diverse data centers in order to facilitate load balancing, redundancy, and/or high availability.

C. Public Cloud Networks

Public cloud networks 340 may be remote server devices (e.g., a plurality of server clusters such as server cluster 200) that can be used for outsourced computation, data storage, communication, and service hosting operations. These servers may be virtualized (i.e., the servers may be virtual machines). Examples of public cloud networks 340 may include Amazon AWS Cloud, Microsoft Azure Cloud (Azure), Google Cloud Platform (GCP), and IBM Cloud Platform. Like remote network management platform 320, multiple server clusters supporting public cloud networks 340 may be deployed at geographically diverse locations for purposes of load balancing, redundancy, and/or high availability.

Managed network 300 may use one or more of public cloud networks 340 to deploy applications and services to its clients and customers. For instance, if managed network 300 provides online music streaming services, public cloud networks 340 may store the music files and provide web interface and streaming capabilities. In this way, the enterprise of managed network 300 does not have to build and maintain its own servers for these operations.

Remote network management platform 320 may include modules that integrate with public cloud networks 340 to expose virtual machines and managed services therein to managed network 300. The modules may allow users to request virtual resources, discover allocated resources, and provide flexible reporting for public cloud networks 340. In order to establish this functionality, a user from managed network 300 might first establish an account with public cloud networks 340, and request a set of associated resources. Then, the user may enter the account information into the appropriate modules of remote network management platform 320. These modules may then automatically discover the manageable resources in the account, and also provide reports related to usage, performance, and billing.

D. Communication Support and Other Operations

Internet 350 may represent a portion of the global Internet. However, Internet 350 may alternatively represent a different type of network, such as a private wide-area or local-area packet-switched network.

Figure 4:
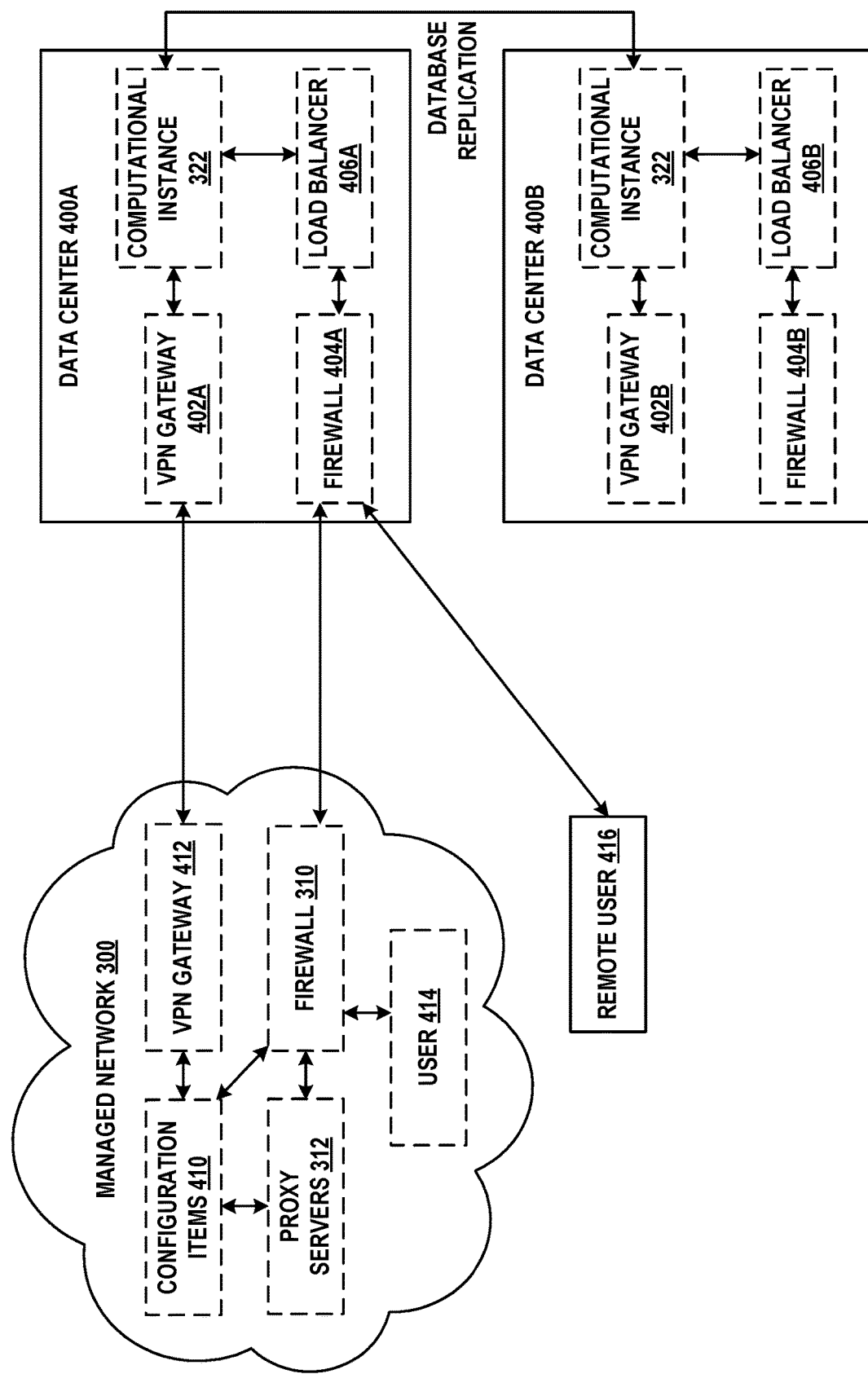
FIG. 4 depicts a communication environment involving a remote network management architecture, in accordance with example embodiments.

FIG. 4 further illustrates the communication environment between managed network 300 and computational instance 322, and introduces additional features and alternative embodiments. In FIG. 4, computational instance 322 is replicated, in whole or in part, across data centers 400A and 400B. These data centers may be geographically distant from one another, perhaps in different cities or different countries. Each data center includes support equipment that facilitates communication with managed network 300, as well as remote users.

In data center 400A, network traffic to and from external devices flows either through VPN gateway 402A or firewall 404A. VPN gateway 402A may be peered with VPN gateway 412 of managed network 300 by way of a security protocol such as Internet Protocol Security (IPSEC) or Transport Layer Security (TLS). Firewall 404A may be configured to allow access from authorized users, such as user 414 and remote user 416, and to deny access to unauthorized users. By way of firewall 404A, these users may access computational instance 322, and possibly other computational instances. Load balancer 406A may be used to distribute traffic amongst one or more physical or virtual server devices that host computational instance 322. Load balancer 406A may simplify user access by hiding the internal configuration of data center 400A, (e.g., computational instance 322) from client devices. For instance, if computational instance 322 includes multiple physical or virtual computing devices that share access to multiple databases, load balancer 406A may distribute network traffic and processing tasks across these computing devices and databases so that no one computing device or database is significantly busier than the others. In some embodiments, computational instance 322 may include VPN gateway 402A, firewall 404A, and load balancer 406A.

Data center 400B may include its own versions of the components in data center 400A. Thus, VPN gateway 402B, firewall 404B, and load balancer 406B may perform the same or similar operations as VPN gateway 402A, firewall 404A, and load balancer 406A, respectively. Further, by way of real-time or near-real-time database replication and/or other operations, computational instance 322 may exist simultaneously in data centers 400A and 400B.

Data centers 400A and 400B as shown in FIG. 4 may facilitate redundancy and high availability. In the configuration of FIG. 4, data center 400A is active and data center 400B is passive. Thus, data center 400A is serving all traffic to and from managed network 300, while the version of computational instance 322 in data center 400B is being updated in near-real-time. Other configurations, such as one in which both data centers are active, may be supported.

Should data center 400A fail in some fashion or otherwise become unavailable to users, data center 400B can take over as the active data center. For example, domain name system (DNS) servers that associate a domain name of computational instance 322 with one or more Internet Protocol (IP) addresses of data center 400A may re-associate the domain name with one or more IP addresses of data center 400B. After this re-association completes (which may take less than one second or several seconds), users may access computational instance 322 by way of data center 400B.

FIG. 4 also illustrates a possible configuration of managed network 300. As noted above, proxy servers 312 and user 414 may access computational instance 322 through firewall 310. Proxy servers 312 may also access configuration items 410. In FIG. 4, configuration items 410 may refer to any or all of client devices 302, server devices 304, routers 306, and virtual machines 308, any components thereof, any applications or services executing thereon, as well as relationships between devices, components, applications, and services. Thus, the term "configuration items" may be shorthand for part of all of any physical or virtual device, or any application or service remotely discoverable or managed by computational instance 322, or relationships between discovered devices, applications, and services. Configuration items may be represented in a configuration management database (CMDB) of computational instance 322.

As stored or transmitted, a configuration item may be a list of attributes that characterize the hardware or software that the configuration item represents. These attributes may include manufacturer, vendor, location, owner, unique identifier, description, network address, operational status, serial number, time of last update, and so on. The class of a configuration item may determine which subset of attributes are present for the configuration item (e.g., software and hardware configuration items may have different lists of attributes).

As noted above, VPN gateway 412 may provide a dedicated VPN to VPN gateway 402A. Such a VPN may be helpful when there is a significant amount of traffic between managed network 300 and computational instance 322, or security policies otherwise suggest or require use of a VPN between these sites. In some embodiments, any device in managed network 300 and/or computational instance 322 that directly communicates via the VPN is assigned a public IP address. Other devices in managed network 300 and/or computational instance 322 may be assigned private IP addresses (e.g., IP addresses selected from the 10.0.0.0-10.255.255.255 or 192.168.0.0-192.168.255.255 ranges, represented in shorthand as subnets 10.0.0.0/8 and 192.168.0.0/16, respectively). In various alternatives, devices in managed network 300, such as proxy servers 312, may use a secure protocol (e.g., TLS) to communicate directly with one or more data centers.

IV. Example Discovery

In order for remote network management platform 320 to administer the devices, applications, and services of managed network 300, remote network management platform 320 may first determine what devices are present in managed network 300, the configurations, constituent components, and operational statuses of these devices, and the applications and services provided by the devices. Remote network management platform 320 may also determine the relationships between discovered devices, their components, applications, and services. Representations of each device, component, application, and service may be referred to as a configuration item. The process of determining the configuration items and relationships within managed network 300 is referred to as discovery, and may be facilitated at least in part by proxy servers 312. Representations of configuration items and relationships are stored in a CMDB.

While this section describes discovery conducted on managed network 300, the same or similar discovery procedures may be used on public cloud networks 340. Thus, in some environments, "discovery" may refer to discovering configuration items and relationships on a managed network and/or one or more public cloud networks.

For purposes of the embodiments herein, an "application" may refer to one or more processes, threads, programs, client software modules, server software modules, or any other software that executes on a device or group of devices. A "service" may refer to a high-level capability provided by one or more applications executing on one or more devices working in conjunction with one another. For example, a web service may involve multiple web application server threads executing on one device and accessing information from a database application that executes on another device.

Figure 5:
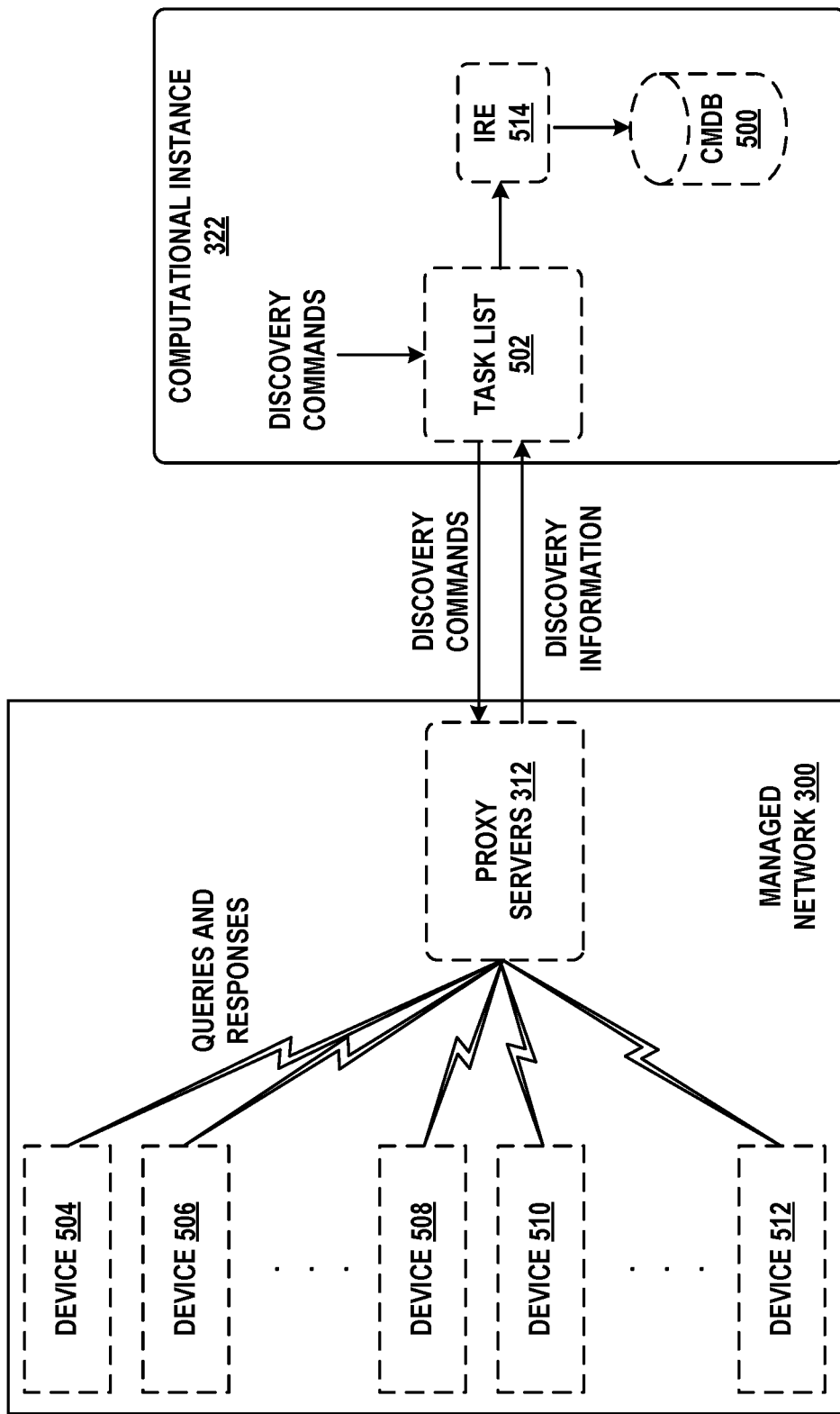
FIG. 5 depicts another communication environment involving a remote network management architecture, in accordance with example embodiments.

FIG. 5 provides a logical depiction of how configuration items and relationships can be discovered, as well as how information related thereto can be stored. For sake of simplicity, remote network management platform 320, public cloud networks 340, and Internet 350 are not shown.

In FIG. 5, CMDB 500, task list 502, and identification and reconciliation engine (IRE) 514 are disposed and/or operate within computational instance 322. Task list 502 represents a connection point between computational instance 322 and proxy servers 312. Task list 502 may be referred to as a queue, or more particularly as an external communication channel (ECC) queue. Task list 502 may represent not only the queue itself but any associated processing, such as adding, removing, and/or manipulating information in the queue.

As discovery takes place, computational instance 322 may store discovery tasks (jobs) that proxy servers 312 are to perform in task list 502, until proxy servers 312 request these tasks in batches of one or more. Placing the tasks in task list 502 may trigger or otherwise cause proxy servers 312 to begin their discovery operations. For example, proxy servers 312 may poll task list 502 periodically or from time to time, or may be notified of discovery commands in task list 502 in some other fashion. Alternatively or additionally, discovery may be manually triggered or automatically triggered based on triggering events (e.g., discovery may automatically begin once per day at a particular time).

Regardless, computational instance 322 may transmit these discovery commands to proxy servers 312 upon request. For example, proxy servers 312 may repeatedly query task list 502, obtain the next task therein, and perform this task until task list 502 is empty or another stopping condition has been reached. In response to receiving a discovery command, proxy servers 312 may query various devices, components, applications, and/or services in managed network 300 (represented for sake of simplicity in FIG. 5 by devices 504, 506, 508, 510, and 512). These devices, components, applications, and/or services may provide responses relating to their configuration, operation, and/or status to proxy servers 312. In turn, proxy servers 312 may then provide this discovered information to task list 502 (i.e., task list 502 may have an outgoing queue for holding discovery commands until requested by proxy servers 312 as well as an incoming queue for holding the discovery information until it is read).

IRE 514 may be a software module that removes discovery information from task list 502 and formulates this discovery information into configuration items (e.g., representing devices, components, applications, and/or services discovered on managed network 300) as well as relationships therebetween. Then, IRE 514 may provide these configuration items and relationships to CMDB 500 for storage therein. The operation of IRE 514 is described in more detail below.

In this fashion, configuration items stored in CMDB 500 represent the environment of managed network 300. As an example, these configuration items may represent a set of physical and/or virtual devices (e.g., client devices, server devices, routers, or virtual machines), applications executing thereon (e.g., web servers, email servers, databases, or storage arrays), as well as services that involve multiple individual configuration items. Relationships may be pairwise definitions of arrangements or dependencies between configuration items.

In order for discovery to take place in the manner described above, proxy servers 312, CMDB 500, and/or one or more credential stores may be configured with credentials for the devices to be discovered. Credentials may include any type of information needed in order to access the devices. These may include userid/password pairs, certificates, and so on. In some embodiments, these credentials may be stored in encrypted fields of CMDB 500. Proxy servers 312 may contain the decryption key for the credentials so that proxy servers 312 can use these credentials to log on to or otherwise access devices being discovered.

There are two general types of discovery-horizontal and vertical (top-down). Each are discussed below.

A. Horizontal Discovery

Horizontal discovery is used to scan managed network 300, find devices, components, and/or applications, and then populate CMDB 500 with configuration items representing these devices, components, and/or applications. Horizontal discovery also creates relationships between the configuration items. For instance, this could be a "runs on" relationship between a configuration item representing a software application and a configuration item representing a server device on which it executes. Typically, horizontal discovery is not aware of services and does not create relationships between configuration items based on the services in which they operate.

There are two versions of horizontal discovery. One relies on probes and sensors, while the other also employs patterns. Probes and sensors may be scripts (e.g., written in JAVASCRIPT®) that collect and process discovery information on a device and then update CMDB 500 accordingly. More specifically, probes explore or investigate devices on managed network 300, and sensors parse the discovery information returned from the probes.

Patterns are also scripts that collect data on one or more devices, process it, and update the CMDB. Patterns differ from probes and sensors in that they are written in a specific discovery programming language and are used to conduct detailed discovery procedures on specific devices, components, and/or applications that often cannot be reliably discovered (or discovered at all) by more general probes and sensors. Particularly, patterns may specify a series of operations that define how to discover a particular arrangement of devices, components, and/or applications, what credentials to use, and which CMDB tables to populate with configuration items resulting from this discovery.

Both versions may proceed in four logical phases: scanning, classification, identification, and exploration. Also, both versions may require specification of one or more ranges of IP addresses on managed network 300 for which discovery is to take place. Each phase may involve communication between devices on managed network 300 and proxy servers 312, as well as between proxy servers 312 and task list 502. Some phases may involve storing partial or preliminary configuration items in CMDB 500, which may be updated in a later phase.

In the scanning phase, proxy servers 312 may probe each IP address in the specified range(s) of IP addresses for open Transmission Control Protocol (TCP) and/or User Datagram Protocol (UDP) ports to determine the general type of device and its operating system. The presence of such open ports at an IP address may indicate that a particular application is operating on the device that is assigned the IP address, which in turn may identify the operating system used by the device. For example, if TCP port 135 is open, then the device is likely executing a WINDOWS® operating system. Similarly, if TCP port 22 is open, then the device is likely executing a UNIX® operating system, such as LINUX®. If UDP port 161 is open, then the device may be able to be further identified through the Simple Network Management Protocol (SNMP). Other possibilities exist.

In the classification phase, proxy servers 312 may further probe each discovered device to determine the type of its operating system. The probes used for a particular device are based on information gathered about the devices during the scanning phase. For example, if a device is found with TCP port 22 open, a set of UNIX®-specific probes may be used. Likewise, if a device is found with TCP port 135 open, a set of WINDOWS®-specific probes may be used. For either case, an appropriate set of tasks may be placed in task list 502 for proxy servers 312 to carry out. These tasks may result in proxy servers 312 logging on, or otherwise accessing information from the particular device. For instance, if TCP port 22 is open, proxy servers 312 may be instructed to initiate a Secure Shell (SSH) connection to the particular device and obtain information about the specific type of operating system thereon from particular locations in the file system. Based on this information, the operating system may be determined. As an example, a UNIX® device with TCP port 22 open may be classified as AIX®, HPUX, LINUX®, MACOS®, or SOLARIS®. This classification information may be stored as one or more configuration items in CMDB 500.

In the identification phase, proxy servers 312 may determine specific details about a classified device. The probes used during this phase may be based on information gathered about the particular devices during the classification phase. For example, if a device was classified as LINUX®, a set of LINUX®-specific probes may be used. Likewise, if a device was classified as WINDOWS® 10, as a set of WINDOWS®-10-specific probes may be used. As was the case for the classification phase, an appropriate set of tasks may be placed in task list 502 for proxy servers 312 to carry out. These tasks may result in proxy servers 312 reading information from the particular device, such as basic input/output system (BIOS) information, serial numbers, network interface information, media access control address(es) assigned to these network interface(s), IP address(es) used by the particular device and so on. This identification information may be stored as one or more configuration items in CMDB 500 along with any relevant relationships therebetween. Doing so may involve passing the identification information through IRE 514 to avoid generation of duplicate configuration items, for purposes of disambiguation, and/or to determine the table(s) of CMDB 500 in which the discovery information should be written.

In the exploration phase, proxy servers 312 may determine further details about the operational state of a classified device. The probes used during this phase may be based on information gathered about the particular devices during the classification phase and/or the identification phase. Again, an appropriate set of tasks may be placed in task list 502 for proxy servers 312 to carry out. These tasks may result in proxy servers 312 reading additional information from the particular device, such as processor information, memory information, lists of running processes (software applications), and so on. Once more, the discovered information may be stored as one or more configuration items in CMDB 500, as well as relationships.

Running horizontal discovery on certain devices, such as switches and routers, may utilize SNMP. Instead of or in addition to determining a list of running processes or other application-related information, discovery may determine additional subnets known to a router and the operational state of the router's network interfaces (e.g., active, inactive, queue length, number of packets dropped, etc.). The IP addresses of the additional subnets may be candidates for further discovery procedures. Thus, horizontal discovery may progress iteratively or recursively.

Patterns are used only during the identification and exploration phases-under pattern-based discovery, the scanning and classification phases operate as they would if probes and sensors are used. After the classification stage completes, a pattern probe is specified as a probe to use during identification. Then, the pattern probe and the pattern that it specifies are launched.

Patterns support a number of features, by way of the discovery programming language, that are not available or difficult to achieve with discovery using probes and sensors. For example, discovery of devices, components, and/or applications in public cloud networks, as well as configuration file tracking, is much simpler to achieve using pattern-based discovery. Further, these patterns are more easily customized by users than probes and sensors. Additionally, patterns are more focused on specific devices, components, and/or applications and therefore may execute faster than the more general approaches used by probes and sensors.

Once horizontal discovery completes, a configuration item representation of each discovered device, component, and/or application is available in CMDB 500. For example, after discovery, operating system version, hardware configuration, and network configuration details for client devices, server devices, and routers in managed network 300, as well as applications executing thereon, may be stored as configuration items. This collected information may be presented to a user in various ways to allow the user to view the hardware composition and operational status of devices.

Furthermore, CMDB 500 may include entries regarding the relationships between configuration items. More specifically, suppose that a server device includes a number of hardware components (e.g., processors, memory, network interfaces, storage, and file systems), and has several software applications installed or executing thereon. Relationships between the components and the server device (e.g., "contained by" relationships) and relationships between the software applications and the server device (e.g., "runs on" relationships) may be represented as such in CMDB 500.

More generally, the relationship between a software configuration item installed or executing on a hardware configuration item may take various forms, such as "is hosted on", "runs on", or "depends on". Thus, a database application installed on a server device may have the relationship "is hosted on" with the server device to indicate that the database application is hosted on the server device. In some embodiments, the server device may have a reciprocal relationship of "used by" with the database application to indicate that the server device is used by the database application. These relationships may be automatically found using the discovery procedures described above, though it is possible to manually set relationships as well.

In this manner, remote network management platform 320 may discover and inventory the hardware and software (and possible other components) deployed on and provided by managed network 300.

B. Vertical Discovery

Vertical discovery is a technique used to find and map configuration items that are part of an overall service, such as a web service. For example, vertical discovery can map a web service by showing the relationships between a web server application, a LINUX® server device, and a database that stores the data for the web service. Typically, horizontal discovery is run first to find configuration items and basic relationships therebetween, and then vertical discovery is run to establish the relationships between configuration items that make up a service.

Patterns can be used to discover certain types of services, as these patterns can be programmed to look for specific arrangements of hardware and software that fit a description of how the service is deployed. Alternatively or additionally, traffic analysis (e.g., examining network traffic between devices) can be used to facilitate vertical discovery. In some cases, the parameters of a service can be manually configured to assist vertical discovery.

In general, vertical discovery seeks to find specific types of relationships between devices, components, and/or applications. Some of these relationships may be inferred from configuration files. For example, the configuration file of a web server application can refer to the IP address and port number of a database on which it relies. Vertical discovery patterns can be programmed to look for such references and infer relationships therefrom. Relationships can also be inferred from traffic between devices—for instance, if there is a large extent of web traffic (e.g., TCP port 80 or 8080) traveling between a load balancer and a device hosting a web server, then the load balancer and the web server may have a relationship.

Relationships found by vertical discovery may take various forms. As an example, an email service may include an email server software configuration item and a database application software configuration item, each installed on different hardware device configuration items. The email service may have a "depends on" relationship with both of these software configuration items, while the software configuration items have a "used by" reciprocal relationship with the email service. Such services might not be able to be fully determined by horizontal discovery procedures, and instead may rely on vertical discovery and possibly some extent of manual configuration.

C. Advantages of Discovery

Regardless of how discovery information is obtained, it can be valuable for the operation of a managed network. Notably, IT personnel can quickly determine where certain software applications are deployed, and what configuration items make up a service. This allows for rapid pinpointing of root causes of service outages or degradation. For example, if two different services are suffering from slow response times, the CMDB can be queried (perhaps among other activities) to determine that the root cause is a database application that is used by both services having high processor utilization. Thus, IT personnel can address the database application rather than waste time considering the health and performance of other configuration items that make up the services.

In another example, suppose that a database application is executing on a server device, and that this database application is used by an employee onboarding service as well as a payroll service. Thus, if the server device is taken out of operation for maintenance, it is clear that the employee onboarding service and payroll service will be impacted. Likewise, the dependencies and relationships between configuration items may be able to represent the services impacted when a particular hardware device fails.

In general, configuration items and/or relationships between configuration items may be displayed on a web-based interface and represented in a hierarchical fashion. Modifications to such configuration items and/or relationships in the CMDB may be accomplished by way of this interface.

Furthermore, users from managed network 300 may develop workflows that allow certain coordinated activities to take place across multiple discovered devices. For instance, an IT workflow might allow the user to change the common administrator password to all discovered LINUX® devices in a single operation.

V. CMDB Identification Rules and Reconciliation

A CMDB, such as CMDB 500, provides a repository of configuration items and relationships. When properly provisioned, it can take on a key role in higher-layer applications deployed within or involving a computational instance. These applications may relate to enterprise IT service management, operations management, asset management, configuration management, compliance, and so on.

For example, an IT service management application may use information in the CMDB to determine applications and services that may be impacted by a component (e.g., a server device) that has malfunctioned, crashed, or is heavily loaded. Likewise, an asset management application may use information in the CMDB to determine which hardware and/or software components (or other types of components, services, or systems) are being used to support particular enterprise applications. As a consequence of the importance of the CMDB, it is desirable for the information stored therein to be accurate, consistent, and up to date.

A CMDB may be populated in various ways. As discussed above, a discovery procedure may automatically store information including configuration items and relationships in the CMDB. However, a CMDB can also be populated, as a whole or in part, by manual entry, configuration files, and third-party data sources. Given that multiple data sources may be able to update the CMDB at any time, it is possible that one data source may overwrite entries of another data source. Also, two data sources may each create slightly different entries for the same configuration item, resulting in a CMDB containing duplicate data. When either of these occurrences takes place, they can cause the health and utility of the CMDB to be reduced.

In order to mitigate this situation, these data sources might not write configuration items directly to the CMDB. Instead, they may write to an identification and reconciliation application programming interface (API) of IRE 514. Then, IRE 514 may use a set of configurable identification rules to uniquely identify configuration items and determine whether and how they are to be written to the CMDB.

In general, an identification rule specifies a set of configuration item attributes that can be used for this unique identification. Identification rules may also have priorities so that rules with higher priorities are considered before rules with lower priorities. Additionally, a rule may be independent, in that the rule identifies configuration items independently of other configuration items. Alternatively, the rule may be dependent, in that the rule first uses a metadata rule to identify a dependent configuration item.

Metadata rules describe which other configuration items are contained within a particular configuration item, or the host on which a particular configuration item is deployed. For example, a network directory service configuration item may contain a domain controller configuration item, while a web server application configuration item may be hosted on a server device configuration item.

A goal of each identification rule is to use a combination of attributes that can unambiguously distinguish a configuration item from all other configuration items, and is expected not to change during the lifetime of the configuration item. Some possible attributes for an example server device may include serial number, location, operating system, operating system version, memory capacity, and so on. If a rule specifies attributes that do not uniquely identify the configuration item, then multiple components may be represented as the same configuration item in the CMDB. Also, if a rule specifies attributes that change for a particular configuration item, duplicate configuration items may be created.

Thus, when a data source provides information regarding a configuration item to IRE 514, IRE 514 may attempt to match the information with one or more rules. If a match is found, the configuration item is written to the CMDB or updated if it already exists within the CMDB. If a match is not found, the configuration item may be held for further analysis.

Configuration item reconciliation procedures may be used to ensure that only authoritative data sources are allowed to overwrite configuration item data in the CMDB. This reconciliation may also be rules-based. For instance, a reconciliation rule may specify that a particular data source is authoritative for a particular configuration item type and set of attributes. Then, IRE 514 might only permit this authoritative data source to write to the particular configuration item, and writes from unauthorized data sources may be prevented. Thus, the authorized data source becomes the single source of truth regarding the particular configuration item. In some cases, an unauthorized data source may be allowed to write to a configuration item if it is creating the configuration item or the attributes to which it is writing are empty.

Additionally, multiple data sources may be authoritative for the same configuration item or attributes thereof. To avoid ambiguities, these data sources may be assigned precedences that are taken into account during the writing of configuration items. For example, a secondary authorized data source may be able to write to a configuration item's attribute until a primary authorized data source writes to this attribute. Afterward, further writes to the attribute by the secondary authorized data source may be prevented.

In some cases, duplicate configuration items may be automatically detected by IRE 514 or in another fashion. These configuration items may be deleted or flagged for manual de-duplication.

VI. Partial Configuration Items

Figure 6:
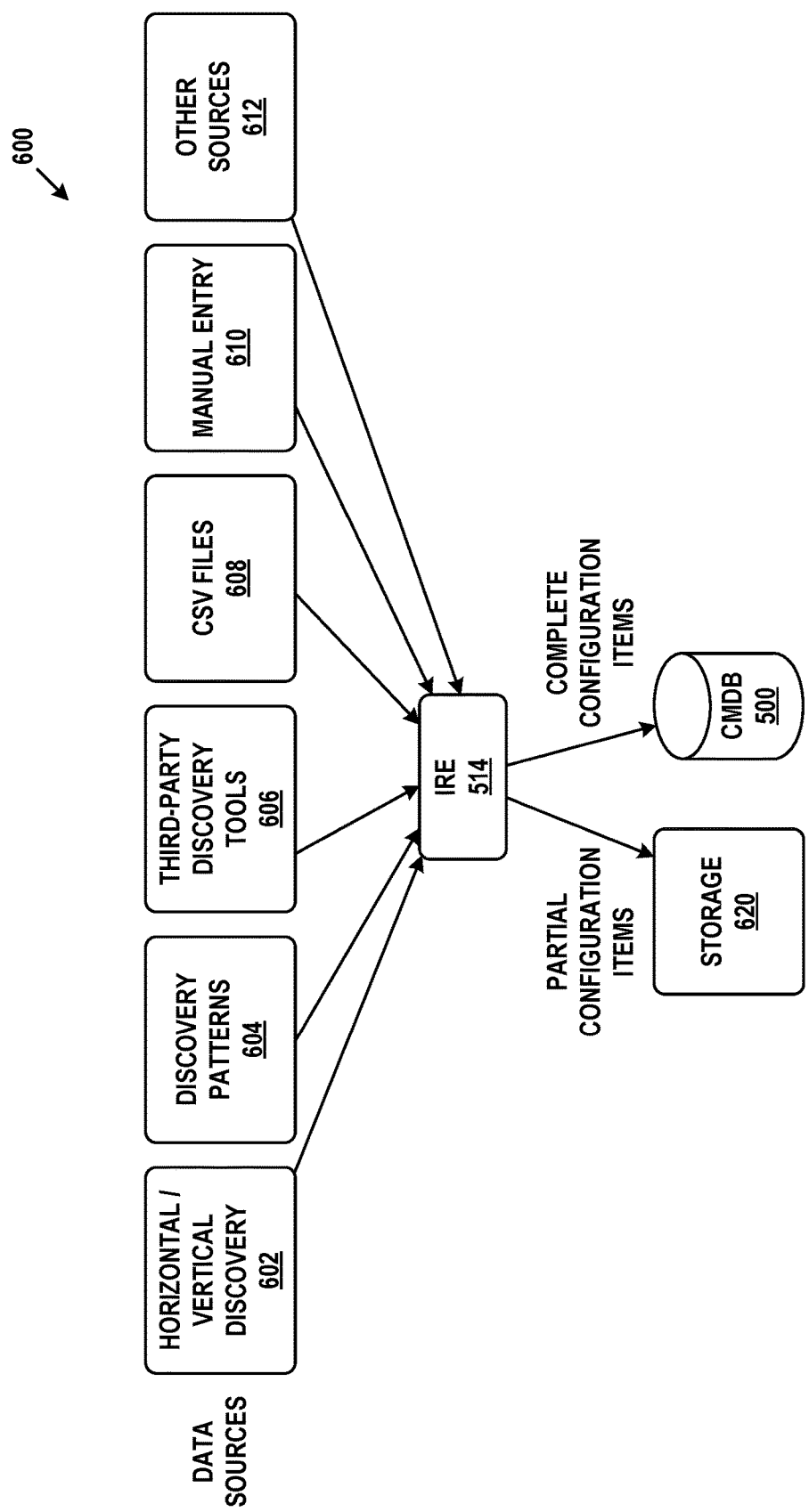
FIG. 6 depicts operations relating to identification and reconciliation, in accordance with example embodiments.

FIG. 6 depicts an architecture and operations relating to IRE 514 in more detail. It is common for a managed network to employ multiple data sources for purposes of discovery. As shown, these data sources may include horizontal and/or vertical discovery 602, discovery patterns 604, third-party-discovery tools 606, CSV files 608, manual entry 610, and other sources 612.

Here, horizontal and/or vertical discovery 602 was described above. Discovery patterns 604 were also described above and are sometimes referred to as service graph connectors. Third-party discovery tools 606 may include any local or remote software application that can provide configuration items to IRE 514. In some cases, these tools are configured to be able to discover many types of configuration items (like horizontal and/or vertical discovery 602) or specific to certain types of hardware and/or software (like discovery patterns 604). CSV files 608 may be comma-separate-value files or any other type of file containing structured information that can be uploaded into and parsed by IRE 514 to identify configuration items therein. Manual entry 610 may involve a user entering configuration information into remote network management platform 320 that can be used by IRE 514 to generate configuration items. Other sources 612 could be specific representational state transfer (REST) interfaces that can be used to discover configuration items, event management applications, orchestration applications, import sets (staging tables for configuration item data before it is written to CMDB 500), and so on.

Multiple data sources may be desirable because any one data source might not be able to discover all configuration items that are used by the managed network. For instance, horizontal and/or vertical discovery 602 may be unable to identify or fully discover certain units of hardware on a managed network. This may be because these units require custom discovery procedures (e.g., specific API calls) or that they are disposed within a public cloud network. In some cases, discovery patterns 604 or third-party discovery tools 606 may be able to discover this hardware. Alternatively, configuration items related to this hardware could be provided in CSV files 608 or by way of manual entry 610. Other possibilities exist. Regardless, CMDB 500 can often be more accurately and completely populated through use of multiple data sources.

In some scenarios, more than one data source may discover the same configuration items, and IRE 514 may reconcile the output of these data sources, when possible, so that CMDB 500 does not contain multiple entries for the same configuration items. For example, if CSV files 608 contains a configuration item that has already been discovered by horizontal and/or vertical discovery 602, IRE 514 may refrain from creating a duplicate configuration item and may update the existing configuration item in CMDB 500 or discard the copy from CSV files 608.

In some cases, IRE 514 may be receiving configuration item data from multiple data sources in parallel. This data may include duplicative or conflicting attributes and values thereof for the same configuration item. IRE 514 is configured to apply its rules to determine the correct interpretation of the configuration item data and how to update CMDB 500 so that it accurately reflects the hardware and software components discovered.

For purposes of this discussion, the term "identification" should be broadly construed to include a number of procedures, steps, checks, and/or rules that IRE 514 can apply to determine whether and to what extent information from a data source can be written to CMDB 500 as a configuration item (including updates to existing configuration items). For example, identification may include one or more of the following procedures: (i) using identification rules on certain attributes (e.g., serial number and/or IP address) of an incoming configuration item to determine if this configuration item corresponds to an existing configuration item in the CMDB 500, (ii) writing the information as a new configuration item or merging an incoming configuration item's attributes with those of an existing configuration item, (iii) normalizing data in attributes of the configuration item to ensure that it adheres to the standardized formats and units of measure used in CMDB 500, (iv) mapping and orchestrating updates to dependencies and relationships between configuration items, (v) detecting conflicts between incoming and existing configuration items and possibly applying predefined rules to resolve these conflicts either automatically or by generating tasks for manual review, and/or (vi) maintaining an audit trail for changes made to configuration items in CMDB 500.

If any of these identification procedures fails or cannot be completed for a configuration item, the "identification" of that configuration item may be deemed to have failed even if the configuration item was partially identified (e.g., a configuration item can have a serial number attribute with a value that uniquely identifies the configuration item but still fails "identification" because other required attributes are not present or not properly formatted). In some cases, this may result in the incoming configuration item being stored as a partial configuration item, as discussed below.

In some situations, a configuration item might not pass "identification" even if that configuration item is complete. For example, IRE 514 rules may require that the configuration item have a known relationship to another configuration item of a specific type. If this relationship is not present, the configuration item may be considered to be a partial configuration item even if it has proper values for all of its required attributes.

Figure 7:
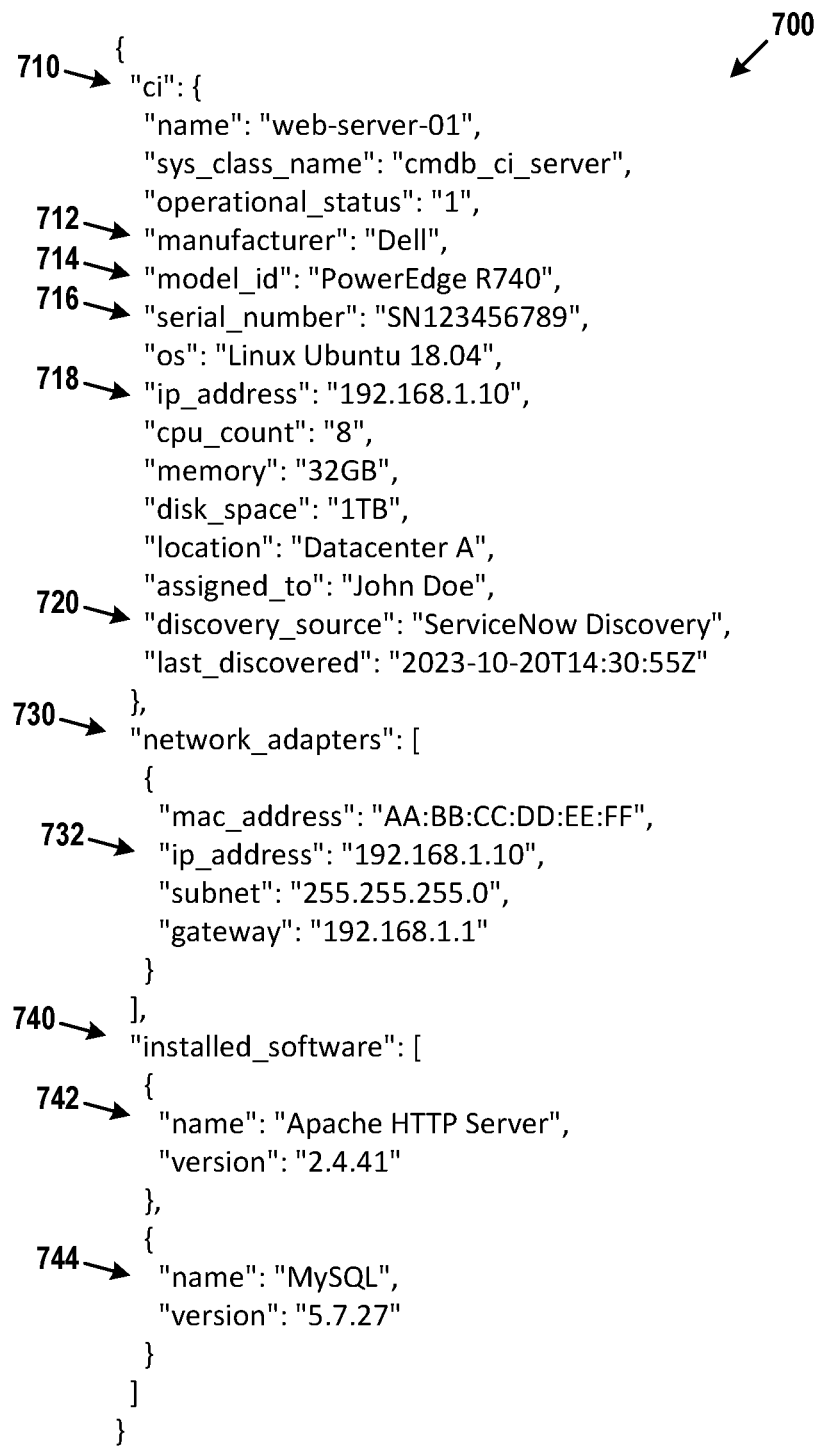
FIG. 7 is a JavaScript Object Notation (JSON) representation of configuration items, in accordance with example embodiments.

For purposes of example, it is assumed herein that discovered configuration items are provided to IRE 514 in the form of blocks of JavaScript Object Notation (JSON), though other formats (e.g., XML or CSV file) could be used. Examples are shown in FIG. 7 as configuration items 700, representing a server device, its network adapter, and its installed software.

The first of configuration items 700 is server device 710 represented as a "ci" with a number of attributes. Some of these attributes include manufacturer 712 (manufacturer), model 714 (model_id), and serial number 716 (serial_number), as well as IP address 718 (ip_address) and discovery source 720 (discovery_source). Discovery source 720 indicates that the discovery source was "ServiceNow Discovery" which could be horizontal and/or vertical discovery 602.

The second of configuration items 700 is a list of network adapters 730. This list includes one entry, network adapter 732. The attributes of this entry include the MAC address, IP address, subnet address, and gateway address assigned to the network adapter.

The third of configuration items 700 is a list of installed software 740. This list includes two entries, installed software 742 and 744. The attributes of these entries include the name and version of the installed software.

In general, such representations of a server device may include more, fewer, or different configuration items, and the configuration items may include more, fewer, or different attributes. In some cases, associations between these configuration items (e.g., that server device 710 contains network adapter 732 and has installed software 742 and 744 thereon) may be implicit through their grouping. In other cases, these associations may be explicit with network adapter 732 and installed software 742 and 744 containing attributes referring to server device 710 in some fashion.

Turning back to FIG. 6, and as noted above, IRE 514 might have access to a set of configurable identification rules that can be used uniquely identify configuration items and determine whether and how they are to be written to the CMDB 500. As an example, IRE 514 may be programmed such that a configuration item of type cmdb_ci_server can only written to CMDB 500 if its manufacturer, model_id, and serial number attributes are populated (or at least populated with non-null values, non-default values, non-empty values, correctly-formatted values, or "proper" values matching a respective pre-defined format for the attribute). Other types of configuration items may have similar rules requiring that certain subsets of their attributes be populated in a proper manner in order for those configuration items to be stored in CMDB 500.

If a configuration item is lacking proper values in one or more of its mandatory attributes, IRE 514 may write this configuration item to storage 620. Here, storage 620 may be a database, database table, or file structure (e.g., one or more JSON files) that can store such partial configuration items. Storage 620 may be volatile or non-volatile memory—thus, in the latter case, storage 620 may hold partial configuration items for an indefinite amount of time. For sake of convenience, attributes determined to contain anything but a valid value may be referred to as a "missing attribute" even if that attribute is present and has a value.

Applying such rules can result in CMDB 500 being more accurate, complete, and useful. As CMDB 500 may serve as the ground truth for the hardware and software disposed within a network, it is desirable for CMDB 500 to avoid incomplete and possibly duplicative configuration items, as these can lead to confusion over what components are actually deployed in the network. By maintaining partial configuration items in storage 620, these partial configuration items might later be completed (e.g., by a further data source that provides the missing attribute(s)) and then moved to CMDB 500.

In practice, discovery is an imperfect process that can fail to identify a configuration item's mandatory attributes for a number of reasons. In some cases, the hardware or software component is unable to provide these attributes to the data source. In other cases, the data source may not properly represent the content of the mandatory attributes, such as by placing this content in the wrong attribute or formatting it improperly. In still other cases, a data source might not be configured to query or request a mandatory attribute. Other possibilities exist, but in general it is often the case that the data sources are not aware of which attributes are deemed mandatory for which configuration items by IRE 514.

Regardless of cause, the number of partial configuration items in storage 620 can grow over time. For some networks, there can be hundreds of thousands of such partial configuration items stuck in a holding pattern until they can be re-reconciled. This not only prevents these configuration items from being stored in CMDB 500 but also requires tens of megabytes of capacity (or more) to be used by storage 620. In some real-world environments, the number of partial configuration items have been observed to be in the hundreds of thousands, which were taking up gigabytes of storage. Thus, system efficiency and performance can be improved by finding ways to reconcile partial configuration items.

In many cases, users of remote network management platform 320 are unaware of the existence of partial configuration items or the storage that they take up. Further, there may be no user interface that notifies users of the existence of these partial configuration items. Thus, some partial configuration items may exist perpetually because no action is taken toward their reconciliation.

VII. Secondary Reconciliation Architecture

Figure 8:
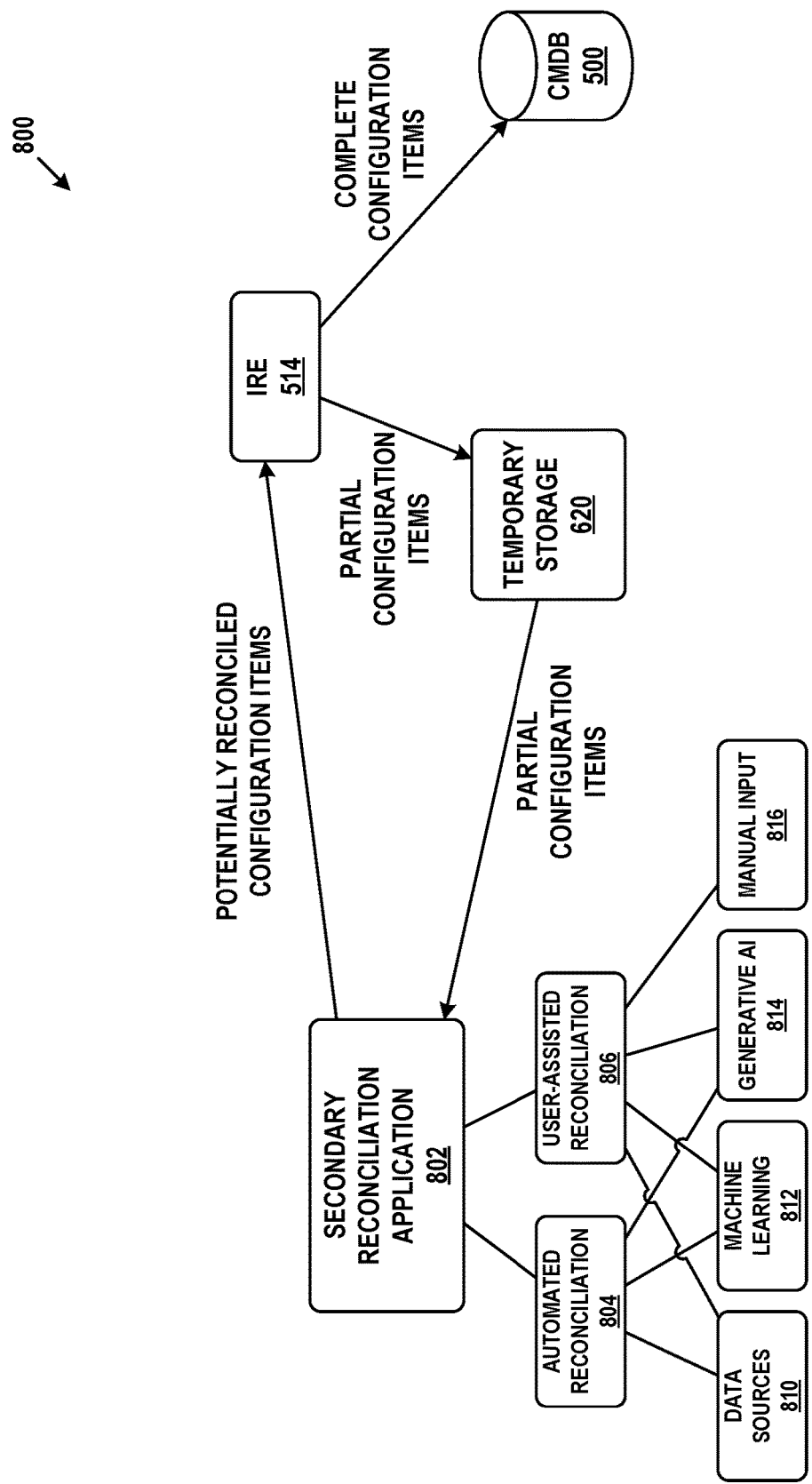
FIG. 8 depicts use of a secondary reconciliation application, in accordance with example embodiments.

FIG. 8 depicts an architecture 800 for secondary reconciliation of partial configuration items. In addition to IRE 514, CMDB 500, and storage 620 described above, architecture 800 includes secondary reconciliation application 802 that is configured to carry out aspects of secondary reconciliation.

For purposes of convenience and organization, secondary reconciliation application 802 may include the capability to operate in accordance with automated reconciliation 804 or user-assisted reconciliation 806. Automated reconciliation 804 may be a procedure that secondary reconciliation application 802 executes on demand, in accordance with a pre-configured schedule, or based on some other trigger. For example, automated reconciliation 804 may be configured to execute once per day, once per week, or once per month. The result of automated reconciliation 804 could be a list of partial configuration items that are potentially reconciled (e.g., missing attributes are populated). This list can be submitted to IRE 514 for processing, possibly after user review and approval. User-assisted reconciliation 806 may be an interactive procedure that secondary reconciliation application 802 performs on demand to guide a user through the secondary reconciliation process. For example, user-assisted reconciliation 806 may be manually executed by a user, perhaps in response to the user receiving a notification or reminder to do so.

Broadly speaking, automated reconciliation 804 may employ one or more of data sources 810, machine learning 812, and/or generative artificial intelligence (AI) 814 to reconcile partial configuration items. User-assisted reconciliation 806 may employ any of these techniques, as well as manual input 816 in an interactive fashion to reconcile partial configuration items. Nonetheless, some manual editing of partial configuration items can occur in conjunction with automated reconciliation 804.

Data sources 810 may be any of the data sources discussed above, such as horizontal and/or vertical discovery 602, discovery patterns 604, third-party-discovery tools 606, CSV files 608, or some other data source. Notably, a distinction is made between manual input 816 and manual entry 610, as the former is intended to relate to secondary reconciliation, whereas the latter is intended to relate to discovery in general. However, manual input 816 and manual entry 610 may be similar interactive procedures in which a user is prompted to provide information relating to configuration items and their attributes.

Regardless of whether automated reconciliation 804 or user-assisted reconciliation 806 is employed, secondary reconciliation application 802 may read some number of partial configuration items from storage 620, attempt to reconcile at least some of these partial configuration items, and then provide potentially reconciled configuration items to IRE 514. IRE 514, in accordance with its rules, may write reconciled configuration items to CMDB 500 as complete configuration items and/or write any of the configuration items that remain unreconciled (e.g., are still partial) back to storage 620. In the case of unreconciled configuration items being written back to storage 620, these configuration items may have had one or more of their attributes updated but are still missing the proper population of at least one mandatory attribute.

The following subsections describe how data sources 810, machine learning 812, generative AI 814, and/or manual input 816 can be used by secondary reconciliation application 802. Nonetheless, secondary reconciliation application 802 may be able to use other techniques.

A. Data Sources

Secondary reconciliation application 802 may employ data sources in a number of ways such as secondary discovery, targeted discovery, or rerunning discovery with a different configuration. The decision of which of these techniques to employ may be pre-configured, made in response to the attribute content of a partial configuration item, and/or based on manual instruction. Notably, more than one of these techniques can be employed for the same partial configuration items.

Secondary discovery may involve performing a discovery procedure with a data source other than the one or ones that were used to generate the partial configuration item. As noted in FIG. 7, the discovery_source attribute may indicate the data source that was used to populate a partial configuration item. Thus, secondary reconciliation application 802 may read this attribute and determine that another data source is available.

For example, suppose that the discovery_source attribute indicates that horizontal and/or vertical discovery 602 was used to populate the partial configuration item. Suppose further that third-party-discovery tools 606 are available but have not been used to discover this partial configuration item. Then, secondary reconciliation application 802 may perform discovery with one or more of third-party-discovery tools 606 in the hope that doing so reconciles (e.g., completes) the partial configuration item.

In some cases, secondary reconciliation application 802 may select such a data source based on the attribute content of the partial configuration item. For instance, it may be known that horizontal and/or vertical discovery 602 cannot discover the serial numbers of certain hardware components but a discovery tool from the manufacturer of this component can determine such serial numbers. In this case, secondary reconciliation application 802 may be configured to select this third-party discovery tool for secondary discovery when these serial numbers are unknown.

Targeted discovery may involve performing discovery on a specific hardware or software component in order to potentially obtain more information about that component. This component may be identified by its assigned IP address or some other unique identifier. Targeted discovery may involve secondary reconciliation application 802 rerunning a discovery of a previously-involved data source or performing discovery using a new data source. For example, a configuration item for a hardware component may have been partially discovered by horizontal and/or vertical discovery 602. However, changes may have been made to this component that could result in horizontal and/or vertical discovery 602 successfully completing discovery. In this case, secondary reconciliation application 802 may rerun horizontal and/or vertical discovery 602 on this specific component in order to attempt completion of the configuration items.

Rerunning discovery with a different configuration may involve changing the parameters of how discovery is performed using a particular data source, and then performing this discovery again. For example, if discovery with a given data source was performed using an unprivileged set of credentials (e.g., user-level permissions), use of these credentials might result in certain attributes of configuration items not being available during discovery. But, if the given data source is used to rerun discovery with privileged credentials (e.g., administrator-level permissions), values for these missing attributes may be discoverable.

Another way that discovery can be rerun is specifically configure the given data source to discover any missing attributes. For instance, if discovery with a given data source was performed with a default configuration, this configuration may not support discovering all discoverable attributes. However, the default configuration may be modifiable such that rerunning discovery using this data source results in at least some missing attributes being discoverable.

While distinct, secondary discovery, targeted discovery, and rerunning discovery may overlap to some extent. For example, rerunning discovery may involve targeting this discovery on a small number of specific components (e.g., based on a network subnet or list of IP addresses).

B. Machine Learning

Alternatively or additionally, secondary reconciliation application 802 may involve use of a trained machine learning model to predict values of missing attributes. For example, secondary reconciliation application 802 may provide at least some attributes of a partial configuration item to the trained machine learning model. The model may return a prediction of the missing attribute, or indicate that it cannot predict the missing attribute. If a prediction is returned, the value of this attribute can be added to the partial configuration item. Then, the partial configuration item can be provided to IRE 514 as a potentially reconciled configuration item.

Figure 9:
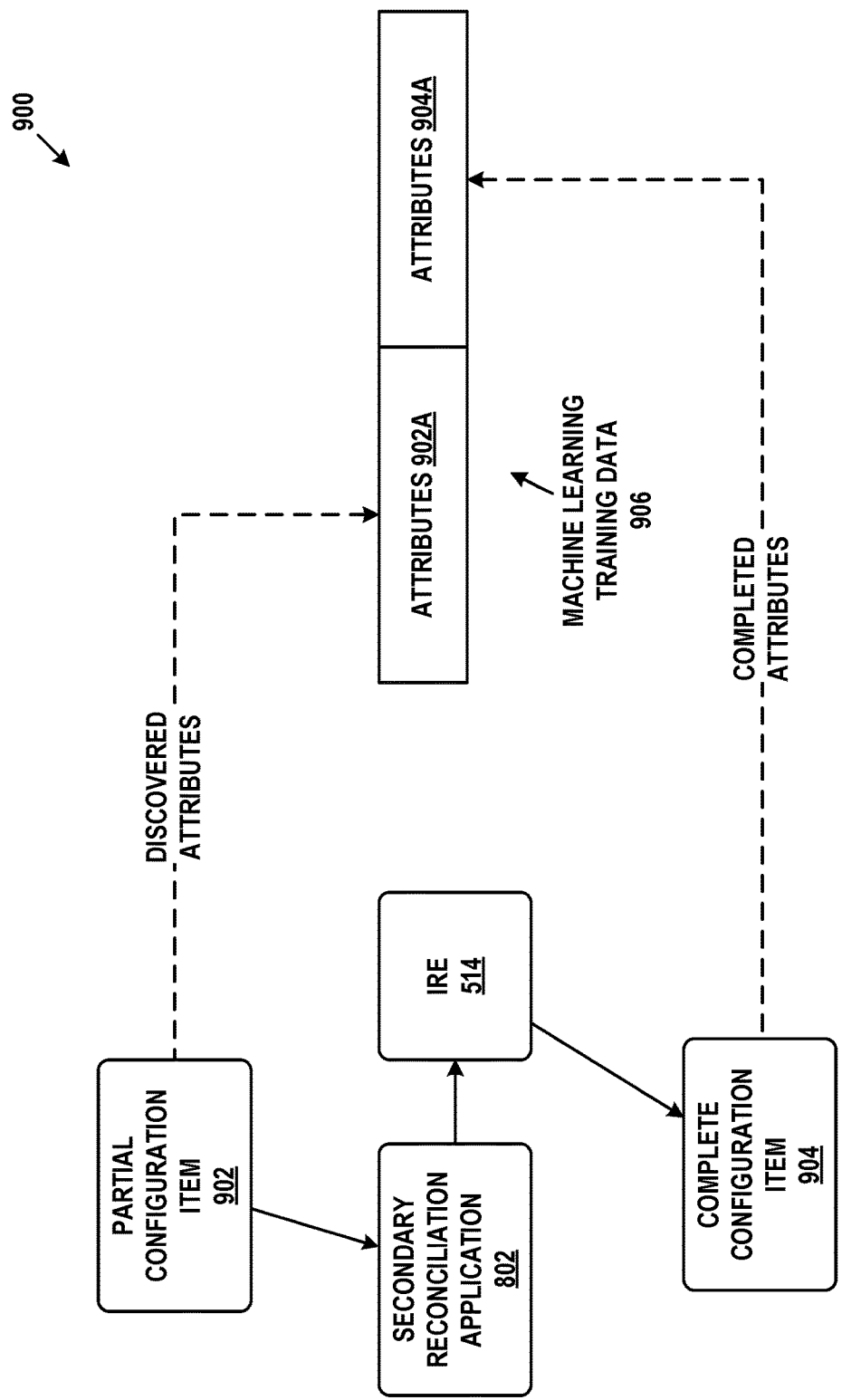
FIG. 9 depicts compilation of training data for a machine learning model that can be used with discovery procedures, in accordance with example embodiments.

Training of the machine learning model may be based on previous reconciliations of partial configuration items. FIG. 9 depicts such a process 900.

In FIG. 9, discovered attributes (e.g., non-missing attributes) of partial configuration item 902 are recorded as attributes 902A. Then, partial configuration item 902 is provided to secondary reconciliation application 802. As described above, secondary reconciliation application 802 may discover some missing attributes of partial configuration item 902 and resubmit partial configuration item 902 with these missing attributes populated to IRE 514 as a potentially reconciled configuration item. Assuming that the reconciliation is effective and that all mandatory attributes are present, the result is complete configuration item 904. From this, completed attributes are written to attributes 904A. The completed attributes are those that were previously missing but were properly populated by secondary reconciliation application 802.

The combination of attributes 902A and 904A can be used as an entry of training data for the machine learning model. Specifically, attributes 902A may be input training data and attributes 904A may be labeled output (ground truth) training data. With a sufficient enough set of entries (e.g., at least a few hundred), this training data can be used to train the machine learning model. Once trained, the model may be capable of predicting the values of missing attributes from discovered attributes in line with its training data. Thus, the model can be applied to partial configuration items stored in storage 620 and predict—at least for some partial configuration items-values of their missing attributes.

Such a procedure would work best if the missing attributes are predictable given the discovered attributes. For example, if the discovered attributes include a model_id of a computing device (e.g., "PowerEdge R740", that device's manufacturer (e.g., "Dell") might be able to be predicted therefrom. However, the device's serial number may not be so easily predicted, as serial numbers tend to be unique per device. In another example, a device's location attribute may be able to be predicted based on its ip_address attribute. In full generality, missing attributes may be predicted from more than just one discovered attribute.

Machine learning models may include any one or more of the following: a decision tree (a flowchart-like tree structure where each node represents a feature, each branch represents a decision or rule, and each leaf represents an outcome) a random forest (an ensemble technique that creates multiple decision trees during training and outputs the most common classification of the individual trees), a support vector machine (finds a hyperplane that best divides a dataset into classes), a neural network (layers of interconnected nodes through which input is propagated to provide output predictions), and/or a gradient boosting machine (an ensemble technique that builds a series of weak learners-typically decision trees-in a sequential manner where each tree corrects the errors of its predecessor). Other possibilities exist.

Even if a machine learning model can predict the values of missing attributes with high confidence, such models are not perfect. Therefore, it can be beneficial to have a user review these predictions before they are written to CMDB 500. For example, the results of applying a machine learning model on a set of partial configuration items may be presented to a user for approval or rejection on a per-configuration-item basis.

C. Generative AI

Alternatively or additionally, secondary reconciliation application 802 may involve use of a trained generative AI model to predict values of missing attributes. In this case, the generative AI model can be trained (or fine-tuned) on records of complete configuration items in CMDB 500 so that it can understand the structure and values commonly found in missing attributes. In some cases, the generative AI model may be a large language model (LLM).

A generative AI model is a natural language application designed to generate sequences of text that are coherent, contextually relevant, and similar to the text on which it was trained. The term "generative" indicates that it can produce (or generate) new content, in addition to classifying or predicting based on pre-existing data. These models are often based on deep learning architectures with structures that involve multiple layers of interconnected nodes (or neurons) designed to capture intricate patterns in data.

One of the most prominent architectures used in modern generative AI models is the transformer architecture. This architecture includes embedding layers (where the input data—e.g., text tokens—are transformed into vectors that capture semantic information about the input), self-attention mechanisms (which allows the model to weigh the importance of different parts of the input relative to one another), feed-forward neural networks (for transforming the data after the self-attention mechanisms have processed it), positional encoders (providing the model information about the position of each token), and normalization (balancing the weights of activation functions in one or more layers).

Multiple such transformer blocks (comprising self-attention and feed-forward networks) are stacked to deepen the model, enabling it to learn more complex patterns and relationships. An output layer can be used to generate the output. For language models, the output layer can produce probabilities for the next token in a sequence.

Generative AI models are often driven by prompts. Prompts may be strings of text that serve as the initial input sequence that conditions the state of a generative AI model, determining its subsequent outputs. In general, the more specific the prompt, the more likely that the generative AI model is going to produce a desired result.

Based on its training, a generative AI model may be able to form associations between groups of attributes and their values. For example, the generative AI model may determine that various patterns exist in the configuration items of CMDB 500. One such pattern may be that a certain model_id is always associated with a particular manufacturer, though the converse is not always true. Thus, the generative AI model can predict manufacturer from model id but not vice-versa. Alternatively, the generative AI model may find that most or all configuration items with a certain model_id and location have a particular cpu_count. Other possibilities exist.

Figure 10:
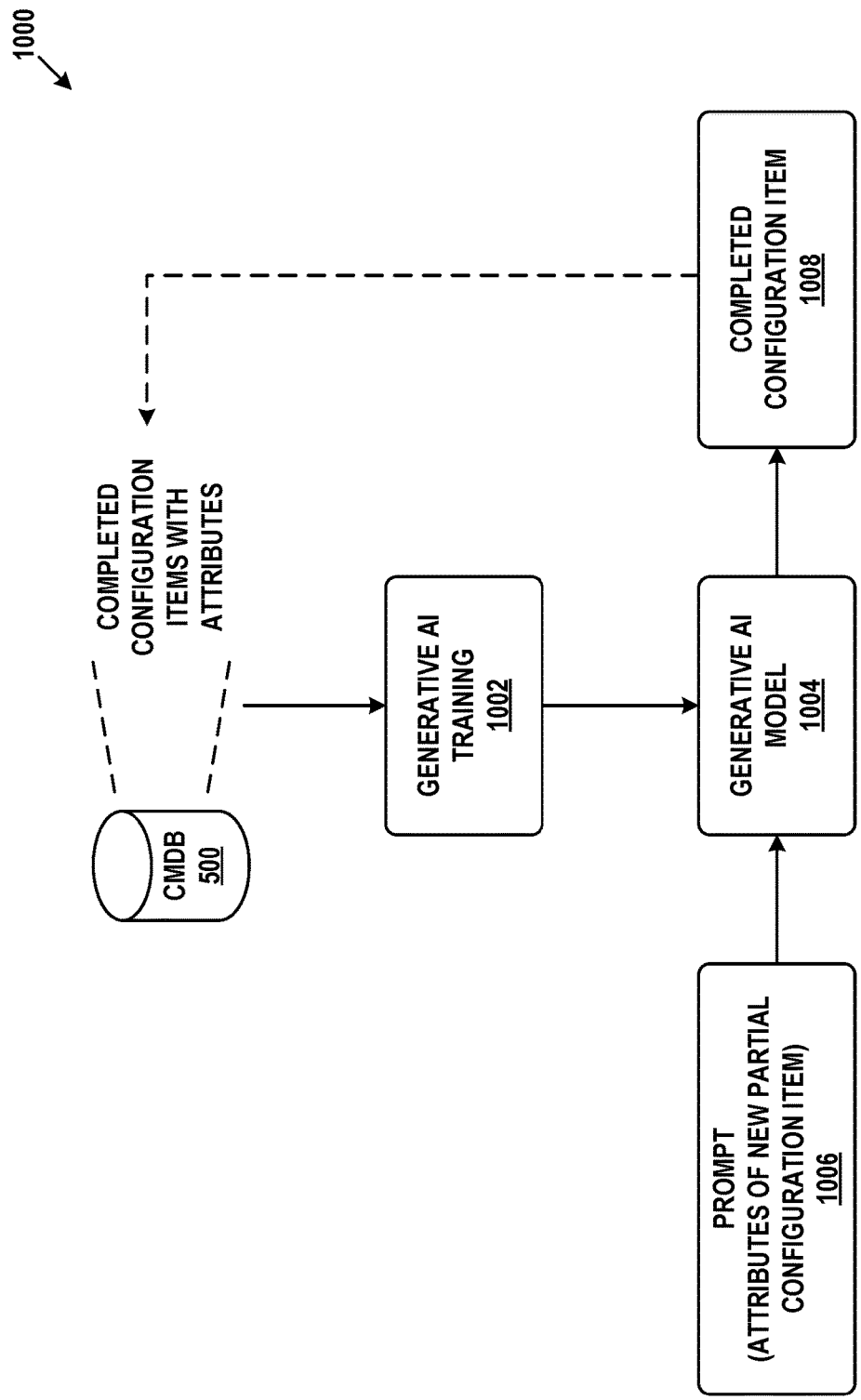
FIG. 10 depicts training and use of a generative AI model that can be used with discovery procedures, in accordance with example embodiments.
Figure 11:
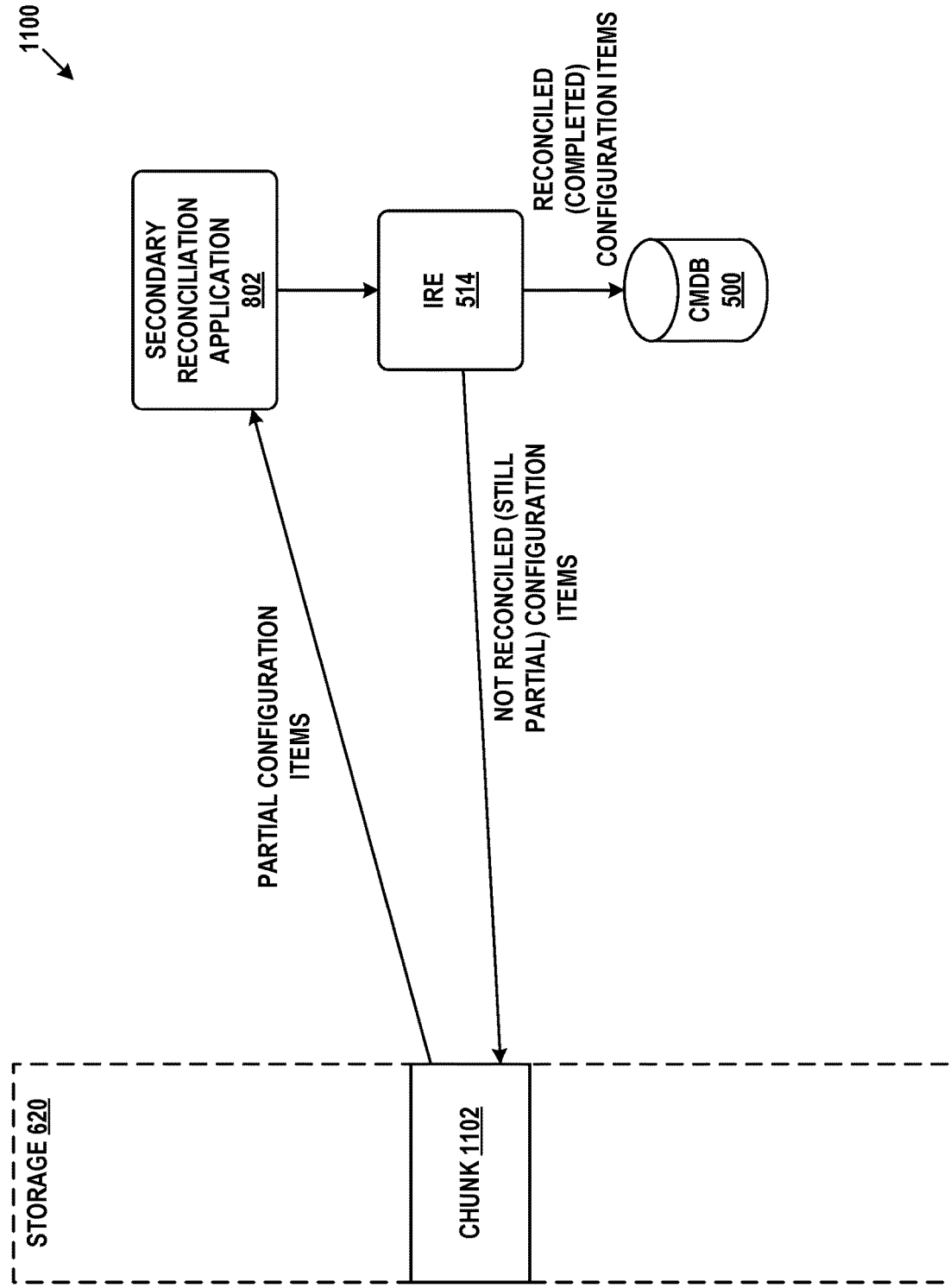
FIG. 11 depicts a memory-efficient streaming procedure for processing partial configuration items, in accordance with example embodiments.

FIG. 10 depicts a process 1000 for training and using a generative AI model. It is assumed that CMDB 500 contains completed configuration items with associated attributes having proper values. Generative AI training 1002 is applied to these configuration items to produce generative AI model 1004. In operation, a prompt 1006 may be provided to generative AI model 1004. This prompt may include at least some of the attributes of a partial configuration item and a request for generative AI model 1004 to predict values of missing attributes. An example of such a prompt might be "for a configuration item with [attribute values] predict the value of [missing attributes]" where [attribute values] represents a list of attributes and their associated values from a partial configuration item and [missing attributes] is one or more of the missing attributes from the partial configuration item. The result may be completed configuration item 1008 (or at least a list of values for the missing attributes). Though not shown, completed configuration item 1008 might not be considered completed or added to CMDB 500 until it passes the identification procedures of IRE 514.

An advantage of generative AI over a trained machine learning model is that generative AI can be trained based on static data in CMDB 500 with no need for tracking the differences in configuration items before and after secondary reconciliation. This can result in a faster training process than can be performed more frequently to keep the generative AI model up to date.

Not unlike machine learning models, generative AI models can predict the values of missing attributes with high confidence but such models are not perfect. Therefore, it can be beneficial to have a user review these predictions before they are written to CMDB 500. For example, the results of applying a generative AI model on a set of partial configuration items may be presented to a user for approval or rejection on a per-configuration-item basis.

D. Manual Input

In some cases, secondary reconciliation application 802 may involve prompting a user for manual input to reconcile partial configuration items. For example, the user may be presented with a list of one or more partial configuration items on a graphical user interface, each with an actuatable control (e.g., a button or menu item). Actuation of the control for a particular partial configuration item may cause the graphical user interface to further present the user with options for modifying the particular partial configuration item. In some cases, the missing attributes may be highlighted in some fashion in order to draw the user's attention. Modifications made to the attributes may cause the particular partial configuration item to be submitted to IRE 514 to determine whether it has been completed.

VIII. Streaming Architecture

In order to reduce memory utilization and improve performance, secondary reconciliation application 802 may employ streaming architecture 1100. This allows secondary reconciliation application 802 to read chunks of the partial configuration items from storage 620 into main memory and process the partial configuration items within each chunk. Once a chunk is processed, the next chunk in storage 620 is read, possibly in a sliding window manner. This improves over the previous technique of reading all of the partial configuration items from storage 620 into main memory at once (which could be several dozens of megabytes).

As shown, storage 620 includes chunk 1102, which may represent one or more configuration items encoded in storage 620. This encoding could be in JSON or XML, as entries in a database structure, or in some other format. Regardless, secondary reconciliation application 802 may read chunk 1102 from storage 620 into main memory for processing. The result may be one or more potentially reconciled configuration items. These may be provided to IRE 514. Those configuration items that are reconciled can be written to CMDB 500 and removed from storage 620. Those that are not reconciled may be written back to storage 620 in an updated form. For example, if a partial configuration item has two missing attributes and secondary reconciliation application 802 determines a proper value for just one of these, the value can be written to the attribute in storage 620.

As noted above, this process can continue for each chunk of partial configuration items in storage 620. These chunks may be of a fixed or variable size (e.g., 1-50 kilobytes) or arranged to contain a fixed number of partial configuration items (e.g., 1-10).

IX. Example Technical Improvements

These embodiments provide a technical solution to a technical problem. One technical problem being solved is reconciliation of partial configuration items. In practice, partial configuration items are problematic because they can number in the thousands or more and take up a large amount of storage to maintain. Further, it is beneficial to reconcile these partial configuration items so that they can be represented in a CMDB and used by other applications.

In the prior art, partial configuration items were silently written to storage and users might not even know of their existence. Reconciliation, to the extent that that it existed, was manual at best. Thus, these techniques do not scale to large discovery targets that could result in thousands of partial configuration items. Moreover, the prior art relies on subjective decisions and experiences of users, which leads to wildly varying outcomes from instance to instance and potentially completing configuration items with incorrect values of missing attributes. Thus, prior art techniques did little, if anything, to address reconciliation of partial configuration items in a timely, efficient, and accurate manner.

The embodiments herein overcome these limitations by providing several possible techniques for secondary reconciliation of partial configuration items based on rerunning discovery procedures in various ways, trained machine learning models, and/or generative AI models. In this manner, reconciliation can be accomplished in a more accurate and robust fashion. This results in several advantages. First, reconciliation can occur automatically and periodically, without users having to remember to initiate it. Second, reconciliation can remove partial configuration items from storage, freeing that memory for other uses. Third, reconciliation can occur in a streaming, pipelined fashion so that use of main memory by partial configuration items can be limited at any given point in time.

Other technical improvements may also flow from these embodiments, and other technical problems may be solved. Thus, this statement of technical improvements is not limiting and instead constitutes examples of advantages that can be realized from the embodiments.

X. Example Operations

Figure 12:
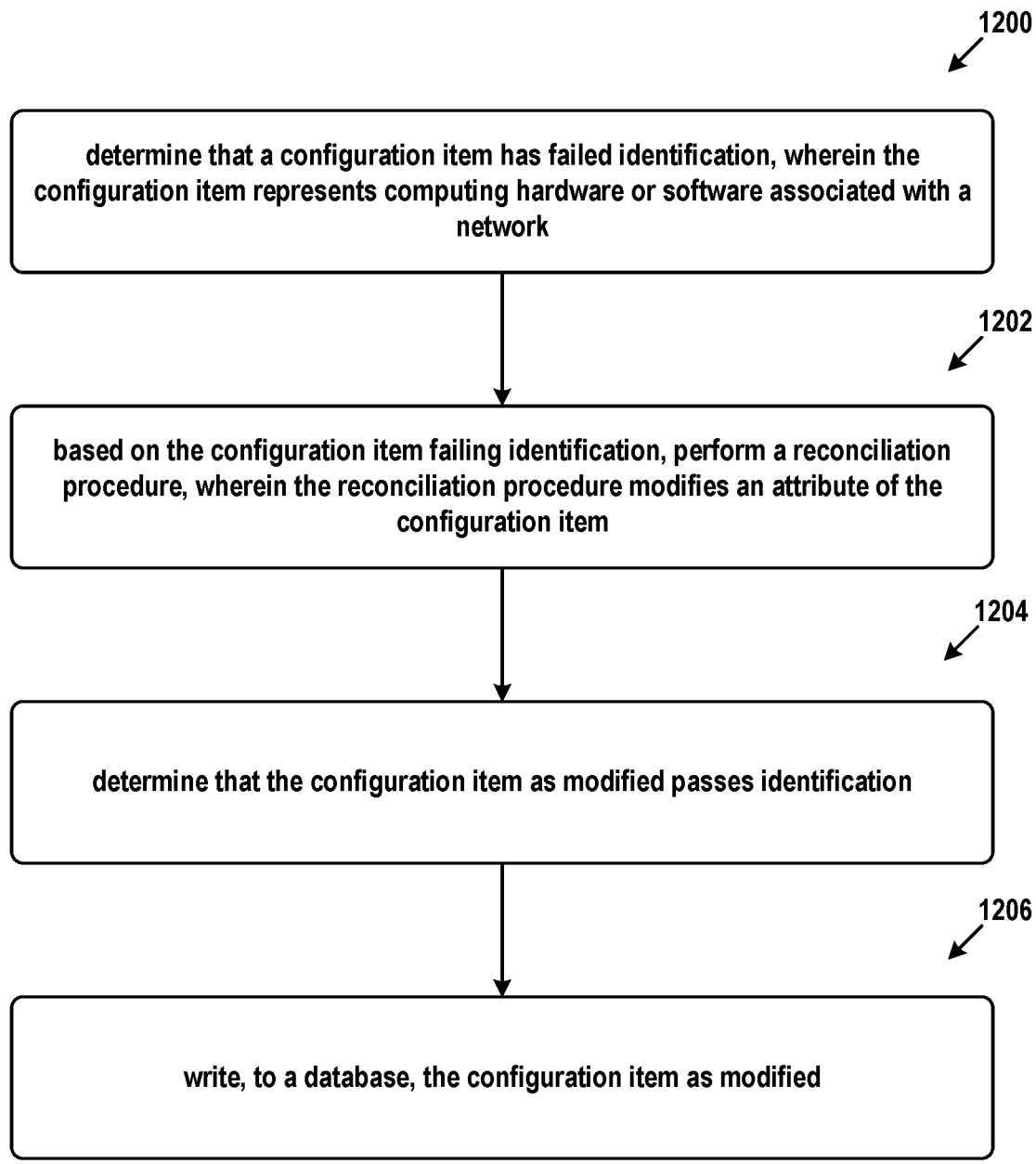
FIG. 12 is a flow chart, in accordance with example embodiments.

FIG. 12 is a flow chart illustrating an example embodiment. The process illustrated by FIG. 12 may be carried out by a computing device, such as computing device 100, and/or a cluster of computing devices, such as server cluster 200. However, the process can be carried out by other types of devices or device subsystems. For example, the process could be carried out by a computational instance of a remote network management platform or a portable computer, such as a laptop or a tablet device.

The embodiments of FIG. 12 may be simplified by the removal of any one or more of the features shown therein. Further, these embodiments may be combined with features, aspects, and/or implementations of any of the previous figures or otherwise described herein.

Block 1200 may involve determining that a configuration item has failed identification (i.e., a partial configuration item), wherein the configuration item represents computing hardware or software associated with a network. In some cases, the configuration item represents a virtual machine, a service, or some other aspect of a managed network.

Block 1202 may involve, based on the configuration item failing identification, performing a reconciliation procedure (i.e., a secondary reconciliation), wherein the reconciliation procedure modifies an attribute of the configuration item. In some cases, modifying an attribute involves changing the value of an attribute. In other cases, modifying an attribute involves creating a new attribute that did not previously exist for the configuration item. Other possibilities exist.

Block 1204 may involve determining that the configuration item as modified passes identification.

Block 1206 may involve writing, to a database, the configuration item as modified.

In some implementations, the computing hardware or software is disposed upon the network.

In some implementations, the configuration item prior to modification was a result of a discovery procedure performed on the network, wherein the reconciliation procedure comprises performing the discovery procedure again on at least part of the network.

In some implementations, performing the discovery procedure again comprises performing the discovery procedure on a subset of the network identified by a set of network addresses or a range of component identifiers.

In some implementations, performing the discovery procedure again comprises performing the discovery procedure using a different set of access credentials.

In some implementations, the configuration item prior to modification was a result of a discovery procedure performed on the network, wherein the reconciliation procedure comprises performing a different discovery procedure on at least part of the network.

In some implementations, the attribute has an empty or incorrectly-formatted value prior to performing the reconciliation procedure, wherein the reconciliation procedure modifies the attribute to have a non-empty and correctly-formatted value.

In some implementations, the attribute has an empty or incorrectly-formatted value prior to performing the reconciliation procedure, wherein the attribute having a non-empty and correctly-formatted value is required for the configuration item to pass identification.

Some implementations may further involve: based on the configuration item failing identification, storing the configuration item in memory; and based on the configuration item as modified passing identification, deleting the configuration item from the memory.

In some implementations, the configuration item is associated with a plurality of attributes, wherein the configuration item prior to modification was a result of a discovery procedure performed on the network, and wherein the reconciliation procedure comprises: providing a subset of the attributes to a trained machine learning model, wherein the trained machine learning model was trained to predict, based on values of the subset of the attributes, target attribute values that have caused other configuration items to pass identification; receiving a target attribute value for the attribute from the trained machine learning model; and modifying the attribute of the configuration item to have the target attribute value.

In some implementations, the configuration item is associated with a plurality of attributes, wherein the configuration item prior to modification was a result of a discovery procedure performed on the network, and wherein the reconciliation procedure comprises: providing a subset of the attributes to a trained generative artificial intelligence (AI)

model, wherein the trained generative AI model was trained to predict, based on other configuration items that have passed identification, groupings of attribute values; based on a representation of the groupings of attribute values, receiving a target attribute value for the attribute from the trained generative AI model; and modifying the attribute of the configuration item to have the target attribute value.

In some implementations, the configuration item is one of a plurality of configuration items that have failed identification, wherein the plurality of configuration items are stored in memory as one or more files or database entries, and wherein performing the reconciliation procedure comprises reading, from the one or more files or database entries, a block of data containing the configuration item but less than an entirety of the plurality of configuration items.

In some implementations, the configuration item is one of a plurality of configuration items that have failed identification, wherein the plurality of configuration items are stored in memory as one or more files or database entries, and wherein performing the reconciliation procedure comprises iteratively streaming, from the one or more files or database entries, blocks of data respectively containing different subsets of the configuration items.

XI. Closing

The present disclosure is not to be limited in terms of the particular embodiments described in this application, which are intended as illustrations of various aspects. Many modifications and variations can be made without departing from its scope, as will be apparent to those skilled in the art. Functionally equivalent methods and apparatuses within the scope of the disclosure, in addition to those described herein, will be apparent to those skilled in the art from the foregoing descriptions. Such modifications and variations are intended to fall within the scope of the appended claims.

The above detailed description describes various features and operations of the disclosed systems, devices, and methods with reference to the accompanying figures. The example embodiments described herein and in the figures are not meant to be limiting. Other embodiments can be utilized, and other changes can be made, without departing from the scope of the subject matter presented herein. It will be readily understood that aspects of the present disclosure, as generally described herein, and illustrated in the figures, can be arranged, substituted, combined, separated, and designed in a wide variety of different configurations.

With respect to any or all of the message flow diagrams, scenarios, and flow charts in the figures and as discussed herein, each step, block, and/or communication can represent a processing of information and/or a transmission of information in accordance with example embodiments. Alternative embodiments are included within the scope of these example embodiments. In these alternative embodiments, for example, operations described as steps, blocks, transmissions, communications, requests, responses, and/or messages can be executed out of order from that shown or discussed, including substantially concurrently, in reverse order, or repeatedly, depending on the functionality involved. Further, more or fewer blocks and/or operations can be used with any of the message flow diagrams, scenarios, and flow charts discussed herein, and these message flow diagrams, scenarios, and flow charts can be combined with one another, in part or in whole.

A step or block that represents a processing of information can correspond to circuitry that can be configured to perform the specific logical functions of a herein-described method or technique. Alternatively or additionally, a step or block that represents a processing of information can correspond to a module, a segment, or a portion of program code (including related data). The program code can include one or more instructions executable by a processor for implementing specific logical operations or actions in the method or technique. The program code and/or related data can be stored on any type of computer readable medium such as a storage device including RAM, a disk drive, a solid-state drive, or another storage medium.

The computer readable medium can also include non-transitory computer readable media such as non-transitory computer readable media that store data for short periods of time like register memory and processor cache. The non-transitory computer readable media can further include non-transitory computer readable media that store program code and/or data for longer periods of time. Thus, the non-transitory computer readable media may include secondary or persistent long-term storage, like ROM, optical or magnetic disks, solid-state drives, or compact disc read only memory (CD-ROM), for example. The non-transitory computer readable media can also be any other volatile or non-volatile storage systems. A non-transitory computer readable medium can be considered a computer readable storage medium, for example, or a tangible storage device.

Moreover, a step or block that represents one or more information transmissions can correspond to information transmissions between software and/or hardware modules in the same physical device. However, other information transmissions can be between software modules and/or hardware modules in different physical devices.

The particular arrangements shown in the figures should not be viewed as limiting. It should be understood that other embodiments could include more or less of each element shown in a given figure. Further, some of the illustrated elements can be combined or omitted. Yet further, an example embodiment can include elements that are not illustrated in the figures.

While various aspects and embodiments have been disclosed herein, other aspects and embodiments will be apparent to those skilled in the art. The various aspects and embodiments disclosed herein are for purpose of illustration and are not intended to be limiting, with the true scope being indicated by the following claims.

What is claimed is:

1. A method comprising:
    determining that a first configuration item has failed identification due to a first attribute of the first configuration item, wherein the first configuration item represents computing hardware or software associated with a network;
    based on the first configuration item failing identification, writing the first configuration item to storage;
    loading a plurality of partial configuration items from the storage, including the first configuration item and a second configuration item, wherein the second configuration item includes a second attribute;
    performing a reconciliation procedure, wherein the reconciliation procedure modifies the first attribute of the first configuration item and the second attribute of the second configuration item;
    determining that the first configuration item as modified passes identification and that the second configuration item as modified fails identification;
    writing, to a database, the first configuration item as modified; and writing, to the storage, the second configuration item as modified.

2. The method of claim 1, wherein the computing hardware or software is disposed upon the network.

3. The method of claim 1, wherein the first configuration item prior to modification was a result of a discovery procedure performed on the network, and wherein the reconciliation procedure comprises performing the discovery procedure again on at least part of the network.

4. The method of claim 3, wherein performing the discovery procedure again comprises performing the discovery procedure on a subset of the network identified by a set of network addresses or a range of component identifiers.

5. The method of claim 3, wherein performing the discovery procedure again comprises performing the discovery procedure using a different set of access credentials.

6. The method of claim 1, wherein the first configuration item prior to modification was a result of a discovery procedure performed on the network, and wherein the reconciliation procedure comprises performing a different discovery procedure on at least part of the network.

7. The method of claim 1, wherein the first attribute has an empty or incorrectly-formatted value prior to performing the reconciliation procedure, and wherein the reconciliation procedure modifies the first attribute to have a non-empty and correctly-formatted value.

8. The method of claim 1, wherein the first attribute has an empty or incorrectly-formatted value prior to performing the reconciliation procedure, and wherein the first attribute having a non-empty and correctly-formatted value is required for the first configuration item to pass identification.

9. The method of claim 1, further comprising:
based on a third configuration item failing identification, storing the third configuration item in memory; and
based on the third configuration item as modified passing identification, deleting the third configuration item from the memory.

10. The method of claim 1, wherein the first configuration item is associated with a plurality of attributes, wherein the first configuration item prior to modification was a result of a discovery procedure performed on the network, and wherein the reconciliation procedure comprises:
providing a subset of the attributes to a trained machine learning model, wherein the trained machine learning model was trained to predict, based on values of the subset of the attributes, target attribute values that have caused other configuration items to pass identification;
receiving a target attribute value for the first attribute from the trained machine learning model; and
modifying the first attribute of the first configuration item to have the target attribute value.

11. The method of claim 1, wherein the first configuration item is associated with a plurality of attributes, wherein the first configuration item prior to modification was a result of a discovery procedure performed on the network, and wherein the reconciliation procedure comprises:
providing a subset of the attributes to a trained generative artificial intelligence (AI) model, wherein the trained generative AI model was trained to predict, based on other configuration items that have passed identification, groupings of attribute values;
based on a representation of the groupings of attribute values, receiving a target attribute value for the first attribute from the trained generative AI model; and
modifying the first attribute of the first configuration item to have the target attribute value.

12. The method of claim 1, wherein the first configuration item is one of a plurality of configuration items that have failed identification, wherein the plurality of configuration items are stored in memory as one or more files or database entries, and wherein performing the reconciliation procedure comprises reading, from the one or more files or database entries, a block of data containing the configuration item but less than an entirety of the plurality of configuration items.

13. The method of claim 1, wherein the first configuration item is one of a plurality of configuration items that have failed identification, wherein the plurality of configuration items are stored in memory as one or more files or database entries, and wherein performing the reconciliation procedure comprises iteratively streaming, from the one or more files or database entries, blocks of data respectively containing different subsets of the configuration items.

14. The method of claim 1, wherein the storage is within the database.

15. A non-transitory computer-readable medium, having stored thereon program instructions that, upon execution by a computing system, cause the computing system to perform operations comprising:
determining that a first configuration item has failed identification due to a first attribute of the first configuration item, wherein the first configuration item represents computing hardware or software associated with a network;
based on the first configuration item failing identification, writing the first configuration item to storage;
loading a plurality of partial configuration items from the storage, including the first configuration item and a second configuration item, wherein the second configuration item includes a second attribute;
performing a reconciliation procedure, wherein the reconciliation procedure modifies the first attribute of the first configuration item and the second attribute of the second configuration item;
determining that the first configuration item as modified passes identification and that the second configuration item as modified fails identification;
writing, to a database, the first configuration item as modified; and
writing, to the storage, the second configuration item as modified.

16. The non-transitory computer-readable medium of claim 15, wherein the first configuration item prior to modification was a result of a discovery procedure performed on the network, wherein the reconciliation procedure comprises performing the discovery procedure again on at least part of the network, and wherein performing the discovery procedure again comprises performing the discovery procedure on a subset of the network identified by a set of network addresses or a range of component identifiers.

17. The non-transitory computer-readable medium of claim 15, wherein the first configuration item prior to modification was a result of a discovery procedure performed on the network, wherein the reconciliation procedure comprises performing the discovery procedure again on at least part of the network, and wherein performing the discovery procedure again comprises performing the discovery procedure using a different set of access credentials.

18. The non-transitory computer-readable medium of claim 15, wherein the first attribute has an empty or incorrectly-formatted value prior to performing the reconciliation procedure, and wherein the reconciliation procedure modifies the first attribute to have a non-empty and correctly-formatted value.

19. The non-transitory computer-readable medium of claim 15, wherein the first configuration item is associated with a plurality of attributes, wherein the first configuration item prior to modification was a result of a discovery procedure performed on the network, and wherein the reconciliation procedure comprises:
   providing a subset of the attributes to a trained generative artificial intelligence (AI) model, wherein the trained generative AI model was trained to predict, based on other configuration items that have passed identification, groupings of attribute values;
   based on a representation of the groupings of attribute values, receiving a target attribute value for the first attribute from the trained generative AI model; and
   modifying the first attribute of the first configuration item to have the target attribute value.

20. A system comprising:
   one or more processors; and
   memory, containing program instructions that, upon execution by the one or more processors, cause the system to perform operations comprising:
   determining that a first configuration item has failed identification due to a first attribute of the first configuration item, wherein the first configuration item represents computing hardware or software associated with a network;
   based on the first configuration item failing identification, writing the first configuration item to storage;
   loading a plurality of partial configuration items from the storage, including the first configuration item and a second configuration item, wherein the second configuration item includes a second attribute;
   performing a reconciliation procedure, wherein the reconciliation procedure modifies the first attribute of the first configuration item and the second attribute of the second configuration item;
   determining that the first configuration item as modified passes identification and that the second configuration item as modified fails identification;
   writing, to a database, the first configuration item as modified; and
   writing, to the storage, the second configuration item as modified.

* * * * *